(12) United States Patent
Garthwaite

(10) Patent No.: US 7,945,911 B1
(45) Date of Patent: May 17, 2011

(54) BARRIER SYNCHRONIZATION METHOD AND APPARATUS FOR WORK-STEALING THREADS

(75) Inventor: Alexander T. Garthwaite, Beverly, MA (US)

(73) Assignee: Oracle America, Inc., Redwood City, CA (US)

( * ) Notice: Subject to any disclaimer, the term of this patent is extended or adjusted under 35 U.S.C. 154(b) by 1746 days.

(21) Appl. No.: 11/147,066

(22) Filed: Jun. 3, 2005

(51) Int. Cl.
*G06F 9/46* (2006.01)
*G06F 12/00* (2006.01)

(52) U.S. Cl. .................. 718/102; 718/106; 707/814

(58) Field of Classification Search ............ 718/102
See application file for complete search history.

(56) References Cited

U.S. PATENT DOCUMENTS

| | | | |
|---|---|---|---|
| 6,526,422 B1 * | 2/2003 | Flood et al. ............ | 707/206 |
| 6,823,351 B1 | 11/2004 | Flood et al. | |
| 6,826,583 B1 | 11/2004 | Flood et al. | |
| 7,069,281 B2 * | 6/2006 | Garthwaite ............ | 707/206 |
| 7,321,989 B2 * | 1/2008 | Grayver ............... | 714/38 |
| 7,581,222 B2 * | 8/2009 | Blainey et al. ......... | 718/102 |
| 2003/0005025 A1 * | 1/2003 | Shavit et al. .......... | 709/102 |
| 2003/0005029 A1 * | 1/2003 | Shavit et al. .......... | 709/107 |
| 2003/0005114 A1 | 1/2003 | Shavit et al. | |
| 2004/0128401 A1 * | 7/2004 | Fallon et al. .......... | 709/250 |

OTHER PUBLICATIONS

Cheng, et al., "A Parallel, Real-Time Garbage Collector," ACM 2001, pp. 125-136.

Blumofe, et al., "Scheduling Multithreaded Computations by Work Stealing," 1994, Proceedings of the 35th Annual IEEE Conference on Foundations of Computer Science, 13 pages.

Flood, et al., "Parallel Garbage Collection for Shared Memory Multiprocessors," sun.com/research/jtech, Apr. 2001, USENIX JVM Conference, 10 pages.

Arora, et al., "Thread Scheduling for Multiprogrammed Multiprocessors," Proceedings of the Tenth Annual ACM Symposium of Parallel Algorithms and Architectures, Jun. 1998, 11 pages.

* cited by examiner

*Primary Examiner* — Emerson C Puente
*Assistant Examiner* — Camquy Truong
(74) *Attorney, Agent, or Firm* — Robert C. Kowert; Meyertons, Hood, Kivlin, Kowert & Goetzel, P.C.

(57) ABSTRACT

Method and apparatus for barrier synchronization of threads, for example work-stealing threads. Embodiments may provide a consensus barrier synchronization mechanism that allows a "stop world" operation being performed by two or more worker threads configured to "steal" work from other threads to complete, even if one or more of the threads are not scheduled/started by the thread scheduler and thus do not rendezvous or "check in" at a consensus barrier in a timely manner. In embodiments, portions (subtasks) of the overall task which were assigned to the tardy thread may have been completed by other work-stealing threads, and one of the other threads may check in the tardy thread at the consensus barrier upon determining that the thread is dormant and does not have any more apportioned work to be performed. In one embodiment, the task being performed may be garbage collection for a process.

54 Claims, 14 Drawing Sheets

BARRIER SYNCHRONIZATION METHOD AND APPARATUS FOR WORK-STEALING THREADS

BACKGROUND OF THE INVENTION

1. Field of the Invention

This invention relates to computer systems, and more particularly to the load balancing of work distributed among a plurality of threads on a system.

2. Description of the Related Art

Dynamic Memory Allocation

In some systems, which are usually known as "object oriented," objects may have associated methods, which are routines that can be invoked by reference to the object. Objects may belong to a class, which is an organizational entity that may contain method code or other information shared by all objects belonging to that class. However, the term "object" may not be limited to such structures, but may additionally include structures with which methods and classes are not associated. More generally, the term object may be used to refer to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, sixteen, thirty-two, or sixty-four bits of information, although there are other ways to represent a reference.

In many computer applications, memory may be allocated to at least some objects dynamically. Note that not all systems or applications employ dynamic memory allocation. In some computer languages, for example, source programs must be so written that all objects to which the program's variables refer are bound to storage locations at compile time. This memory allocation approach, sometimes referred to as "static allocation," is the policy traditionally used by the Fortran programming language, for example. Note that many systems may allow both static and dynamic memory allocation.

The use of static memory allocation in writing certain long-lived applications makes it difficult to restrict storage requirements to the available memory space. Abiding by space limitations is generally easier when the system provides for dynamic memory allocation, i.e., when memory space to be allocated to a given object is determined only at run time.

Dynamic allocation has a number of advantages, among which is that the run-time system is able to adapt allocation to run-time conditions. For example, a programmer may specify that space should be allocated for a given object only in response to a particular run-time condition. For example, the C-language library function malloc( ) is often used for this purpose. Conversely, the programmer can specify conditions under which memory previously allocated to a given object can be reclaimed for reuse. For example, the C-language library function free( ) results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory need to be performed carefully. If the application fails to reclaim unused memory, or loses track of the address of a dynamically allocated segment of memory, its memory requirements may grow over time to exceed the system's available memory. This kind of error is known as a "memory leak."

Another kind of error may occur when an application reclaims memory for reuse even though the application still maintains at least one reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

Garbage Collection

A method for reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable", i.e. that is unreachable. Statically allocated objects represented by a program's global variables are normally considered reachable throughout a program's life. Statically allocated objects are not ordinarily stored in the garbage collector's managed memory space, but they may contain references to dynamically allocated objects that are stored in the garbage collector's managed memory space, and these dynamically allocated objects are considered reachable. An object referred to in the processor's call stack is reachable, as is an object referred to by register contents. Also, an object referred to by any reachable object is reachable.

The use of garbage collectors is advantageous because, whereas a programmer working on a particular sequence of code may perform creditably in most respects with only local knowledge of the application, memory allocation and reclamation may require a global knowledge of the program. Specifically, a programmer dealing with a given sequence of code may know whether some portion of memory is still in use for that sequence of code, but it is considerably more difficult for the programmer to know what the rest of the application is doing with that memory. By tracing references from a "root set," e.g., global variables, registers, and the call stack, automatic garbage collectors may obtain global knowledge in a methodical way. Garbage collectors relieve the programmer of the need to worry about the application's global state and thus the programmer can concentrate on local-state issues. The result is applications that are more robust, having fewer, or even no, dangling references and memory leaks.

Garbage-collection mechanisms may be implemented by various parts and at various levels of a computing system. For example, some compilers, without the programmer's explicit direction, may additionally generate garbage collection code that automatically reclaims unreachable memory space. Even in this case, though, there is a sense in which the application does not itself provide the entire garbage collector. Specifically, the application will typically call upon the underlying operating system's memory-allocation functions, and the operating system may in turn take advantage of hardware that lends itself particularly to use in garbage collection. So a system may disperse the garbage-collection mechanism over a number of computer-system layers.

To illustrate the variety of system components that may be used to implement garbage collection, FIG. 1 illustrates an exemplary system in which various levels of source code may result in the machine instructions that a processor executes. In FIG. 1, a programmer may produce source code 40 written in a high-level language. A compiler 42 typically converts that code into "class files." These files include routines written in instructions, called "byte code" 44, for a "virtual machine" that various processors may be software-configured to emulate. This conversion into byte code is generally separated in time from the byte code's execution, so FIG. 1 divides the sequence into a "compile-time environment" 46 separate from a "run-time environment" 48, in which execution occurs. One example of a high level language for which compilers are available to produce such virtual-machine instructions is the Java™ programming language. (Java is a trademark or registered trademark of Sun Microsystems, Inc., in the United States and other countries.)

Typically, the class files' byte-code routines are executed by a processor under control of a virtual-machine process 50. That process emulates a virtual machine from whose instruction set the byte code is drawn. As is true of the compiler 42, the virtual-machine process 50 may be specified by code stored on a local disk or some other machine-readable medium from which it is read into RAM to configure the computer system to implement the garbage collector and otherwise act as a virtual machine. Again, though, that code's persistent storage may instead be provided by a server system remote from the processor that implements the virtual machine, in which case the code would be transmitted to the virtual-machine-implementing processor.

In some implementations, much of the virtual machine's action in executing these byte codes is most like what those skilled in the art refer to as "interpreting," so FIG. 1 depicts the virtual machine as including an "interpreter" 52 for that purpose. In addition to or instead of running an interpreter, virtual-machine implementations may compile the byte codes concurrently with the resultant object code's execution, so FIG. 1 further depicts the virtual machine as additionally including a "just-in-time" compiler 54.

The resultant instructions typically invoke calls to a run-time system 56, which handles matters such as loading new class files as needed, and which typically calls on the services of an underlying operating system 58. Note that, in the system shown in FIG. 1, compiler 40 may not contribute to providing the garbage-collection function; garbage collection may instead be implemented as part of the virtual machine 50's functionality.

Independently of the particular garbage collector configuration, garbage collection may involve performing tasks that the garbage collector discovers dynamically. Since an object referred to by a reference in a reachable object is itself considered reachable, a collector that discovers a reachable object may find that it has further work to do, namely, following references in that object to determine whether the references refer to further objects. Note that other types of programs may also involve dynamically discovered tasks. Dynamically discovered tasks often cannot be performed as soon as they are discovered, so the program may maintain a list of discovered tasks to be performed.

Threads

Computer systems typically provide for various types of concurrent operation. A user of a typical desktop computer, for instance, may be simultaneously employing a word-processor program and an e-mail program together with a calculator program. A computer may one processor or several simultaneously operating processors, each of which may be operating on a different program. For computers with a single main processor, operating-system software typically causes that processor to switch from one program to another rapidly enough that the user cannot usually tell that the different programs are not really executing simultaneously. The different running programs are usually referred to as "processes" in this connection, and the change from one process to another is said to involve a "context switch." In a context switch one process is interrupted, and the contents of the program counter, call stacks, and various registers are stored, including those used for memory mapping. Then the corresponding values previously stored for a previously interrupted process are loaded, and execution resumes for that process. Processor hardware and operating system software typically have special provisions for performing such context switches.

A program running as a computer system process may take advantage of such provisions to provide separate, concurrent "threads" of its own execution. Switching threads is similar to switching processes: the current contents of the program counter and various register contents for one thread are stored and replaced with values previously stored for a different thread. But a thread change does not involve changing the memory mapping values, as a process change does, so the new thread of execution has access to the same process-specific physical memory as the same process's previous thread.

In some cases, the use of multiple execution threads is merely a matter of programming convenience. For example, compilers for various programming languages, such as the Java™ programming language, readily provide the "housekeeping" for spawning different threads, so the programmer is not burdened with all the details of making different threads' execution appear simultaneous. In the case of multiprocessor systems, the use of multiple threads may provide speed advantages. A process may be performed more quickly if the system allocates different threads to different processors when processor capacity is available. To take advantage of this fact, programmers may identify constituent operations within their programs that particularly lend themselves to parallel execution. When a program reaches a point in its execution at which the parallel-execution operation can begin, the program may start different execution threads to perform different tasks within that operation.

Garbage Collector Threads

In a garbage collector, for example, the initial, statically identifiable members of the root set may be divided among a plurality of threads (whose execution may be divided among many processors), and those threads may identify reachable objects in parallel.

Each thread could maintain a list of the tasks that it has thus discovered dynamically, and it could proceed to perform all such tasks. However, much of the advantage of parallel processing may be lost if each thread performs only those tasks that it has itself discovered. Suppose, for example, that one thread of a garbage collector encounters many objects that contain many references but that other threads do not. This leaves one thread with many more tasks than the other threads. There could therefore be a significant amount of time during which that thread still has most of its tasks yet to be performed after the other threads have finished all of their tasks.

To avoid the resultant idle time, such parallel-execution operations may be configured so that each thread may perform tasks that other threads have identified. To accomplish this, different threads may be given access to some of the same task lists, and this means that their access to those lists must be synchronized to avoid inconsistency or at least duplication. Between an operation in which a first thread reads a pointer to the next list entry and the operation in which it reads that entry, for example, a second thread may read that entry and proceed to perform the task that it specifies. In the absence of a synchronization mechanism, the first thread may then repeat the task unnecessarily.

Synchronization mechanisms employed to prevent such untoward consequences typically involve atomically performing sets of machine instructions that are otherwise performed separately. Particularly in the multiprocessor systems in which parallel execution is especially advantageous, such "atomic" operations are expensive. Considerable work has therefore been done to minimize the frequency of their use.

Work Stealing

Various mechanisms may use a number of parallel threads or processors to perform a task. Each thread or processor may be assigned a set of subtasks, and may in some cases generate new subtasks to be performed. Load balancing, or distributing the subtasks so that all the threads or processors stay relatively busy, is commonly implemented by such mechanisms. Work stealing is one approach to load balancing among processors or threads.

As originally envisioned, work stealing was intended to support load balancing among general thread schedulers. For example, an operating system (OS) or a runtime system may support a certain number of processors, each with a dispatch queue. All of the threads schedule off a local dispatch queue. If any processors end up with no threads to run in their dispatch queue, an attempt may be made to steal a thread from another dispatch queue.

One approach to load balancing/work stealing is described in a paper by Arora et al. in the 1998 Proceedings of the Tenth Annual ACM Symposium on Parallel Algorithms and Architectures entitled "Thread Scheduling for Multiprogrammed Multiprocessors." That technique employs a deque, i.e., a double-ended queue: access to the queue is afforded at both ends. In the Arora et al. technique, each deque is associated with a single thread, which alone can add, or "push," entries onto the deque. This "owner" thread pushes and retrieves, or "pops," entries onto and from an end of the deque arbitrarily referred to as its "bottom," while any other, "stealer" thread is restricted to popping entries, and only from the other, or "top" end of the deque. These stealer-thread accesses involve atomic operations. However, most deque accesses are performed by the deque's owner thread, and the threads may be configured to avoid using atomic operations for pushing or, in most cases, popping.

However, work stealing has been applied to more specialized tasks. For example, in garbage collection, some sort of "stop world" action may be performed, where all application threads are suspended to let the garbage collector threads run. A work stealing technique may be implemented to allow the collector threads to do load balancing as they are performing tasks. Work stealing is beneficial in this domain because of the way that garbage collection typically proceeds, where each worker thread has an initial set of tasks to perform, and performing those tasks tend to generate even more tasks to be performed to complete the entire garbage collection process. For example, a garbage collector thread may transitively mark objects through a heap. Initially, the tasks to be performed by a collector thread just identify those objects directly reachable from outside the heap. As those objects are marked and scanned for references to additional objects, new tasks may be generated and placed in the work queue, with each new task indicating a new object (or objects) to scan.

Multithreaded garbage collection mechanisms, as well as other multithread mechanisms that employ two or more threads to perform a task, may implement a "consensus barrier", and may attempt to park or suspend threads that are unable to find work or to yield to other threads in the hopes that the scheduler will allow the threads that are not scheduled to make progress. A garbage collection technique to parallelize collection phases in a "stop-world" garbage collector is described in a paper by Flood, et al. in the Proceedings of the Java Virtual Machine Research and Technology Symposium, Monterey, April 2001 titled "Parallel Garbage Collection For Shared Memory Multiprocessors." The general strategy of this technique is to:

assume N worker threads are blocked waiting for a request start N threads on a task (each thread may perform one or more subtasks of the task, as assigned)

rendezvous threads on a consensus barrier when the task is done

In this and similar garbage collection techniques, as well as in other similar mechanisms that employ two or more threads to perform a task, the consensus barrier conventionally requires all the threads to check in before allowing the application to restart. However, if one or more of the worker threads fails to be scheduled/started by the scheduler for a period, the overall pause experienced by the application may be overlong. The scheduler (which may, for example, be a part of the operating system) may have other system threads to be scheduled, or threads for other applications running on the same machine to be managed, and thus may fail to start one or more of the worker threads in a timely fashion. It may even be the case that all threads but one have checked in at the consensus barrier before one of the threads has been scheduled/started, even though the tasks in that thread's deque have already been "stolen" and completed by other work-stealing threads. Yet, since that thread has not yet been scheduled/started by the scheduler, and has thus not yet checked in at the consensus barrier, the application that has been stopped is prevented from restarting, even though the overall task (e.g., garbage collection) has been completed.

FIGS. 2A through 2C illustrate an exemplary mechanism for scheduling several worker threads to perform a task apportioned to the threads into several "subtasks" in deques during an exemplary "stop world" operation, and using a consensus barrier to rendezvous the threads when done. An application (not shown) may be suspended during the stop world operation. An exemplary stop world operation is garbage collection, but note that a similar mechanism may be used for other types of operations.

In FIG. 2A, scheduler 100 may apportion the initial subtasks of the overall task among the deques 106. Each deque may be associated with a particular worker thread 104. Note that scheduler 100 may be, but is not necessarily, a part of operating system software. Scheduler 100 may then start one or more of the threads 104. In this example, scheduler 100 initially starts threads 104A and 104B. However, for some reason, scheduler 100 may not start thread 104C. Threads 104A and 104B, once started by the scheduler 100, begin performing subtasks from their respective deques 106A and 106B. According to the deque mechanism described in the paper by Arora et al., a thread 104 may pop subtasks to be performed from the bottom of its associated deque 106. If additional subtasks that need to be performed by the thread 104 are discovered during performance of one of the subtasks, the thread may push the newly discovered subtask onto the bottom of its associated deque 106. As an example, a garbage collector worker thread may discover an object that needs to be evaluated which is referenced by another object being evaluated in performing a particular subtask, and may push a subtask onto the bottom of associated deque 106 for that discovered object.

In FIG. 2B, threads 104A and 104B continue to perform subtasks. However, thread 104B has completed all subtasks in its deque 106B, which is now empty. Thread 104B may then attempt to "steal" work (subtasks) from other threads' deques 106. According to the deque mechanism described in the paper by Arora et al., to "steal" work, a thread 104 may pop subtasks to be performed from the top of another thread's deque 106. In this example, thread 104B may steal work (subtasks) from deque 106C. Note that thread 104B may also steal work from deque 106A. Also note that, if thread 104A completes its work (empties its deque 106A), thread 104A may also steal work from thread 104C's deque 106C. Further, note that, in performing a subtask stolen from deque 106C, thread 104B may discover new subtasks that are pushed onto the bottom of its associated deque 106B.

In FIG. 2C, threads 104A and 104B have completed all subtasks of the overall tasks, either by performing subtasks from their associated deques 106 or by stealing subtasks from other threads 104, such as thread 104C. When a thread 104 has completed all subtasks in its associated deque 106 and can find no additional work to steal from other threads 104, the thread "checks in" at consensus barrier 102. In this example, both threads 104A and 104B have checked in at consensus barrier 102. Note that consensus barrier may be, but is not necessarily, something as simple as a count of all threads 106 that are scheduled to perform a task, and that checking in at consensus barrier 102 may include decrementing this count.

However, note that thread 104C has not yet been started by scheduler 100, even though the task has been completed. Thus, consensus barrier 102 may still prevent the "stop world" operation from completing, even though the task is otherwise complete. In other words, the suspended application may have to wait for the scheduler to start thread 104C, at which point thread 104C would discover that it has no work to perform and thus checks in at consensus barrier 102, allowing the "stop world" operation to complete.

SUMMARY

Embodiments of a method and apparatus for barrier synchronization of threads, for example work-stealing threads, are described. Embodiments may provide a consensus barrier synchronization mechanism, or simply barrier synchronization mechanism, that allows a "stop world" operation being performed by two or more worker threads configured to "steal" work from other threads to complete, even if one or more of the threads are not scheduled/started by the thread scheduler and thus do not rendezvous or "check in" at a consensus barrier in a timely manner. In embodiments, portions (subtasks) of the overall task which were assigned to the tardy thread may have been completed by other work-stealing threads, and one of the other threads may check in the tardy thread at the consensus barrier upon determining that the thread is dormant and does not have any more apportioned work to be performed. In one embodiment, the task being performed may be garbage collection for a process, such as an application, on a system, and the threads may be garbage collector worker threads.

In embodiments of the barrier synchronization mechanism, rather than have each individual thread be responsible for checking itself in at the consensus barrier, in some cases a thread may be checked in by another thread. In particular, all of the threads, at the start of a stop world process where worker threads are scheduled/started, the threads may be started with a state field for each thread stored in a vector or array, referred to herein as a thread state array, that includes one field or'entry for each worker thread. In one embodiment, a thread may be in one of three states: dormant, active, or stealing. Initially, all threads are in a dormant state. When a thread wakes up or is started by a scheduler to perform work on the task, the thread attempts to atomically change its dormant state to an active state in the thread state vector. If the thread is able to change its state to active, the thread may begin working on subtasks of the task that have been apportioned to it, and the thread has the responsibility for checking itself in at the consensus barrier when all available work has been completed.

Note that one or more of the threads may, for some reason, not be started, and thus may remain in a dormant state as indicated by the thread state array. If, when a thread is active and performing work, the thread needs to steal additional work from another thread, the thread first changes its state from active to stealing. The stealing thread then looks for a victim thread to steal work from. If, while looking for a victim thread, the stealing thread finds a thread whose work queue is empty (the work may already have been performed by the stealing thread or by other stealing threads), and whose state field indicates the thread is still in a dormant state, the stealing thread may change the state in the state field for the dormant thread to a stealing state. At that point, the stealing thread has taken over responsibility for checking in that thread at the consensus barrier. In one embodiment, the stealing thread may decrement an active thread count of the consensus barrier (initially set to N, indicating the total number of threads initially scheduled to perform the task) so that the dormant thread is effectively checked in. In the case where a dormant thread never wakes up in time to do any work at all, its apportioned work may have been performed by one or more stealing threads, and one of the threads may have checked in at the consensus barrier for the dormant thread. Thus, the consensus barrier will have been met, and the suspended application may be able to resume operation in a timely manner.

Figure 1:
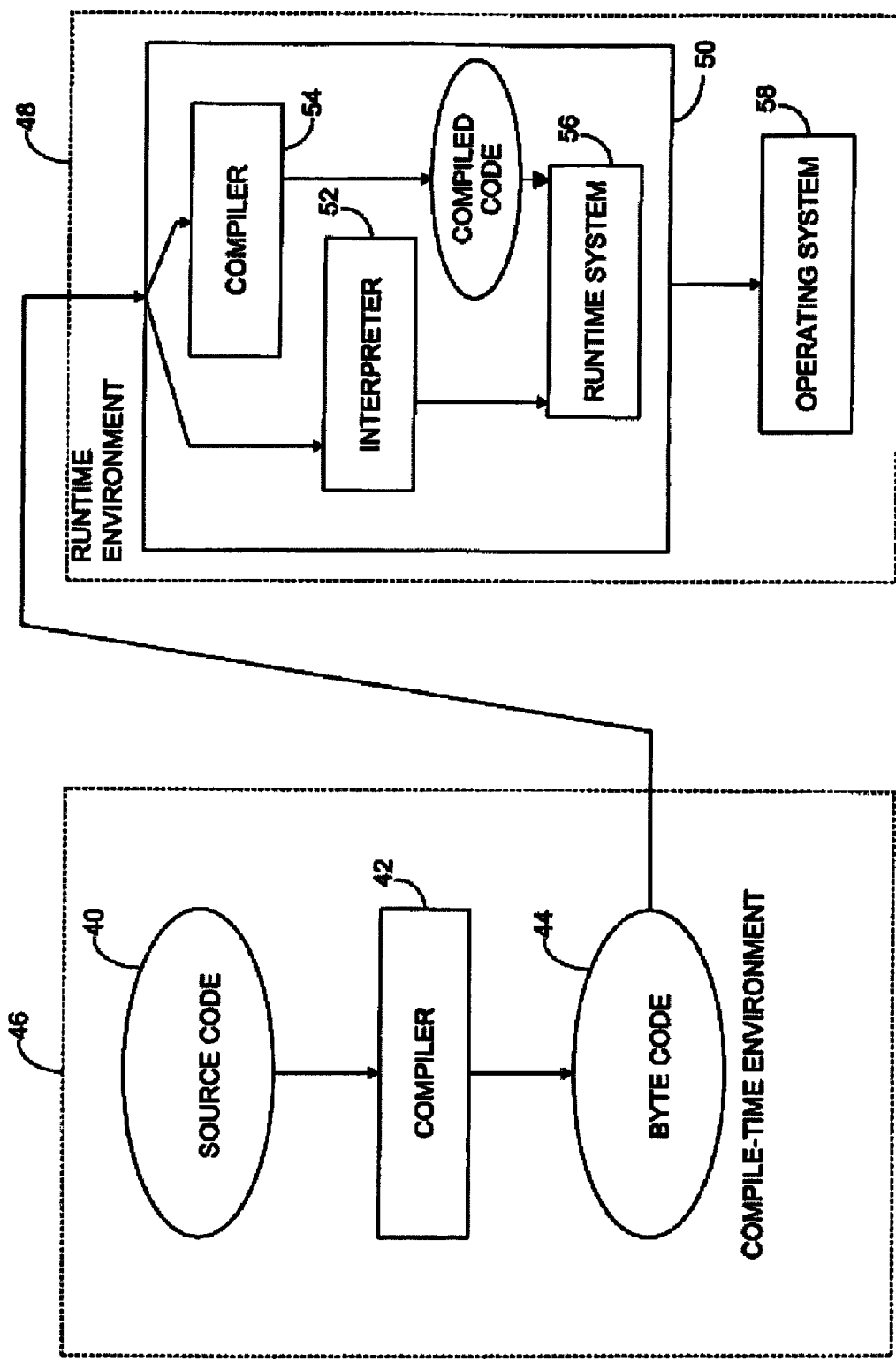
FIG. 1 illustrates an exemplary system in which various levels of source code may result in the machine instructions that a processor executes.
Figure 2A:
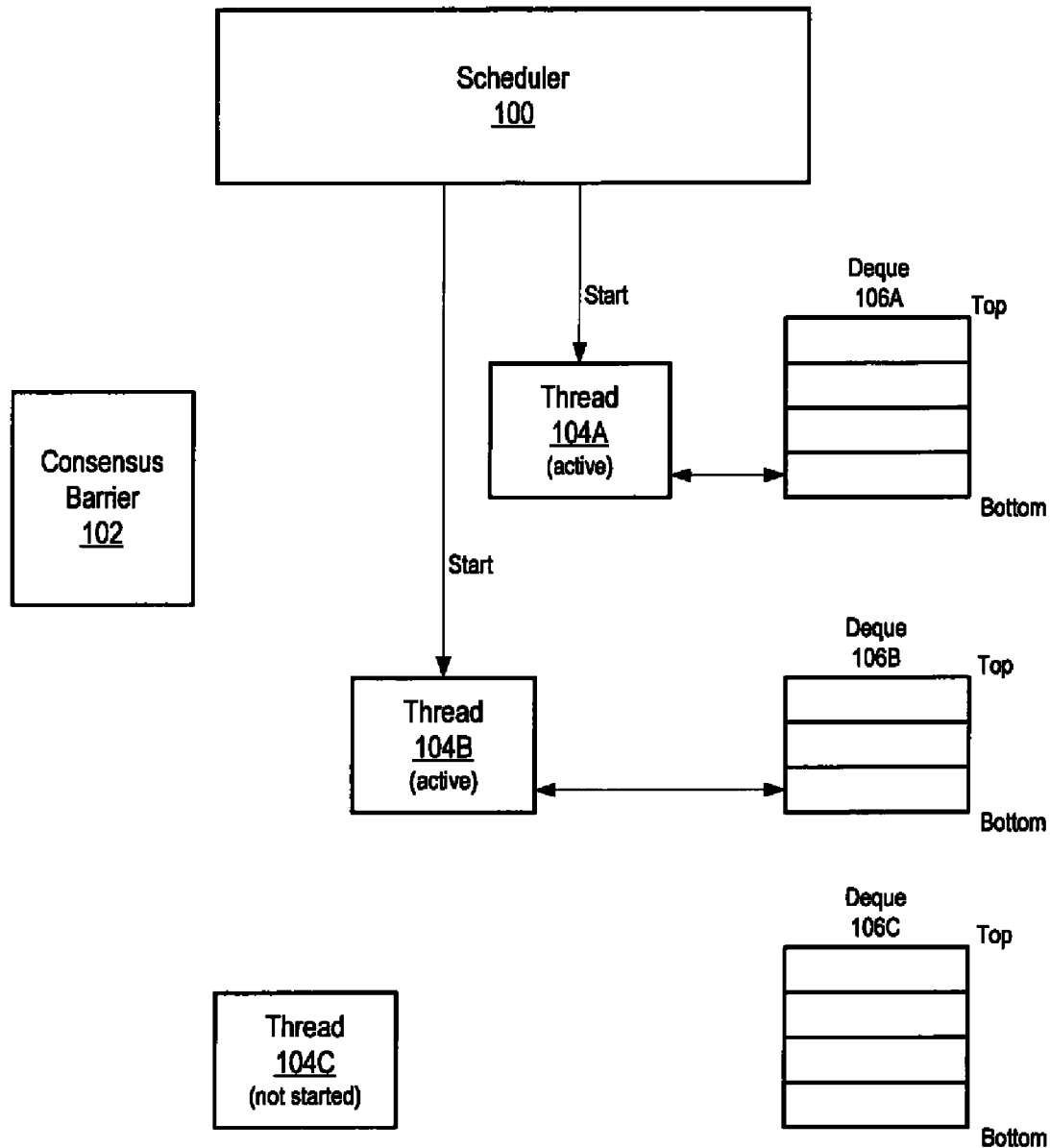
FIGS. 2A through 2C illustrate an exemplary mechanism for scheduling several worker threads to perform a task apportioned to the threads into several "subtasks" in deques during an exemplary "stop world" operation, and using a consensus barrier to rendezvous the threads when done.
Figure 2B:
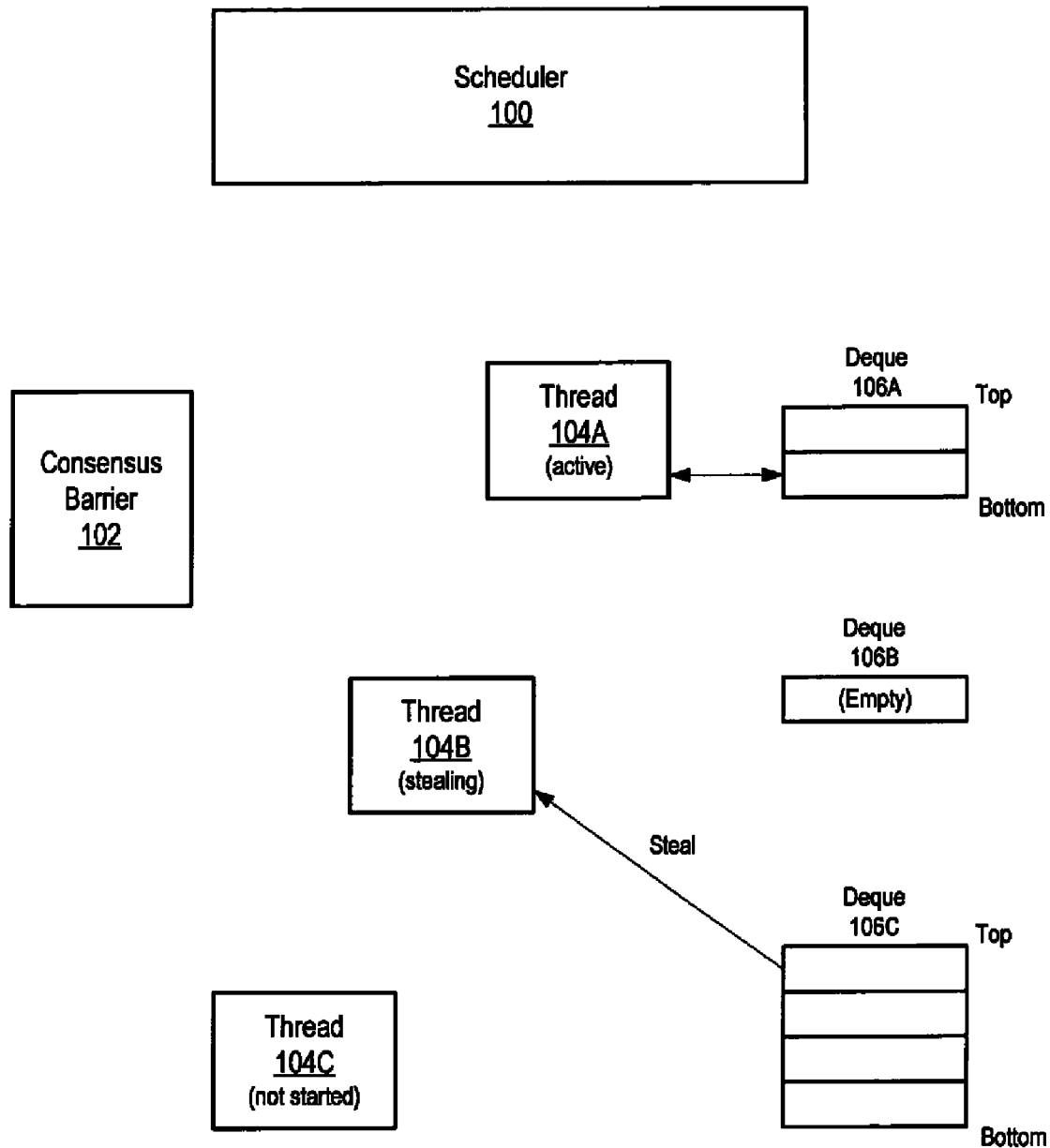
Figure 2C:
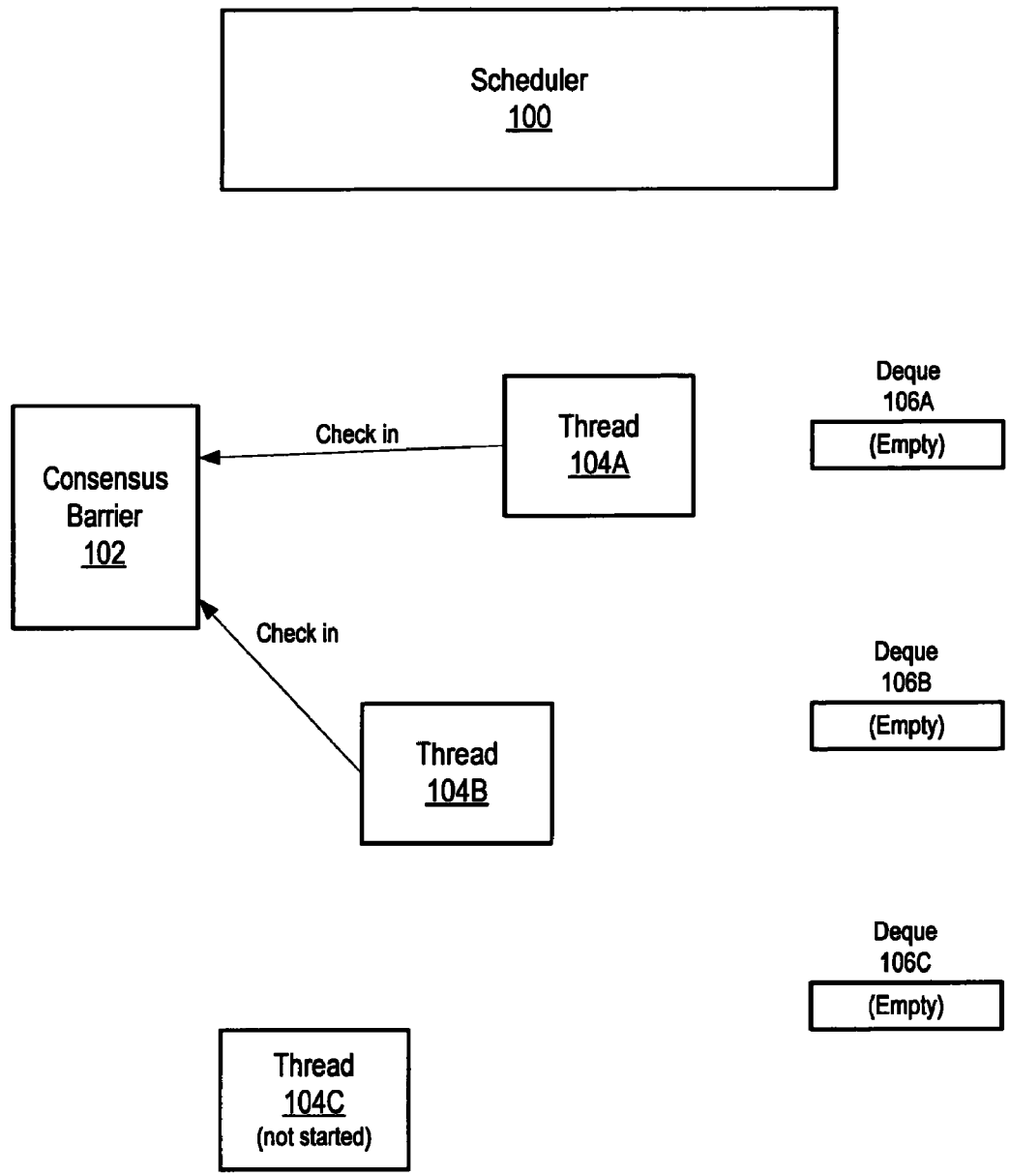

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for barrier synchronization of threads, for example work-stealing threads, are described. Conventionally, consensus barrier mechanisms may be used as a rendezvous for worker threads in which all the threads must rendezvous at the consensus barrier for the task to complete, allowing a suspended application to be restarted. However, conventional consensus barrier mechanisms have to wait for all the threads to rendezvous at the consensus barrier, including any threads that were not scheduled/started by the scheduler immediately. This may result in long delays, even multi-second delays, on even a moderately busy machine.

Embodiments may provide a consensus barrier synchronization mechanism, or simply barrier synchronization mechanism, that allows a "stop world" operation being performed by two or more worker threads configured to "steal" work from other threads to complete, even if one or more of the threads are not scheduled/started by the thread scheduler and thus do not rendezvous or "check in" at a consensus barrier in a timely manner. In embodiments, portions (subtasks) of the overall task which were assigned to the tardy thread may have been completed by other work-stealing threads, and one of the other threads may check in the tardy thread at the consensus barrier upon determining that the thread is dormant and does not have any more apportioned work to be performed.

In embodiments of the barrier synchronization mechanism, states of the worker threads may be "memo-ized" or recorded in an array, vector, or similar data structure. This structure may be referred to herein as a thread state array. In one embodiment, three states for worker threads may be used:
  dormant
  active
  stealing Note that these states are exemplary, and that some embodiments of the barrier synchronization mechanism may implement more or fewer states. Also note that, while the names that are used are indicative of the states of the threads, other names for these states may be substituted. Also note that one skilled in the art would recognize that any of a variety of data structures may be used for such a thread state array, including, but not limited to: an array including an object, which may include one or more fields, for each thread; a bit field or vector wherein a certain number of bits are assigned to each thread to indicate the state of the thread; a vector of bytes wherein one or more bytes are assigned to each thread to indicate the state of the thread; and so on.

In one embodiment of the barrier synchronization mechanism, a global active thread count may be used as a "countdown" consensus barrier. When a thread becomes a stealer thread and checks in at the consensus barrier, the active thread count is decremented. When the active thread count indicates that all threads have checked in, the "stop world" operation is completed and any application(s) that are suspended may be allowed to resume operations. Note that, in one embodiment, a "stealing" thread may decrement the active thread count for a dormant thread (a thread that has not started) and that has no more work to do, as that work has been "stolen" by one or more work-stealing threads.

In one embodiment, at the start of a task, work may be distributed to the N worker threads before the worker threads are started. Note that worker threads may instead or in addition to the above accumulate work by taking from a global/shared source (for example, the scanning of thread stacks and other root sources). Before the worker threads are started, the threads are all in a "dormant" state as indicated in the thread state array, and the active thread count is initialized to N (the number of threads that have been apportioned work to do).

In one embodiment, when first scheduled (started), each worker thread may atomically change its state (e.g., using a suitable atomic instruction such as load-store-unsigned-byte (LDSTUB), compare-and-swap (CAS), or load-linked/store-conditionally (LL/SC)) from dormant to active in the thread state array. If the change of state is successful, the thread continues and proceeds to perform work (e.g., from subtasks stored in an associated deque).

In one embodiment, worker threads that exhaust their own sources of work (e.g., subtasks in a deque) may steal work from other "victim" threads. In finding candidate victim threads, in one embodiment, a worker thread may examine the thread state array to determine the states of other threads, looking for threads that are either dormant or active (stealing threads may have no more work to do in their own deques), and may also examine the work assigned to the other threads, for example subtasks in the threads' associated deques. If another thread has locally assigned, and stealable, work, the thread may attempt to steal work from the other thread. If a potential victim thread does not have work available (e.g., if its deque is empty), and the victim thread is in a "dormant" state as indicated by the thread state array, the stealing thread may compete to atomically change that victim thread's state in the thread state array to "stealing". In one embodiment, if the thread succeeds in changing the state of the victim thread to "stealing", the thread may then decrement the active thread count, effectively "checking in" the victim thread at the consensus barrier. In another embodiment, the thread may just change the state of the victim thread to "stealing" and not immediately decrement the active thread count. In one embodiment, a thread (possibly, but not necessarily, the same thread) or, alternatively, some other process may check the state of the threads in the thread state array and, if all threads are in the "stealing" state, decrement the active count accordingly.

In one embodiment, if a victim thread whose state has been changed to "stealing" and which has been checked in at the consensus barrier by a work-stealing thread "wakes up" (e.g., is started by the scheduler), the victim thread may check its state in the thread state array to discover that it is in a "stealing" state. This may indicate to the thread that it has already been checked in at the consensus barrier by a stealing thread, and that the thread is now in a stealing state. In one embodiment, if the original stealing thread is not configured to decrement the active thread count, the victim (now stealing) thread may decrement the active thread count if there is no more work for it to do (note that one or more other threads may still be active).

In one embodiment, if the victim thread wakes up (e.g., is started by the scheduler) and determines that it is in a "stealing" state according to the thread state array, the thread may check to see if it has work to do (e.g., entries in its associated deque) and, if not, may itself attempt to steal work from other threads (changing its state to "stealing" in the thread state array). In one embodiment, the thread may check the thread state array to see if there are any active (or dormant) threads from which work may be stolen. In one embodiment, the thread may check the active thread count of the consensus barrier to determine if there may be work left to do and, if so, attempt to steal work from other threads.

In one embodiment, if there is work left to do (either in the thread's associated deque or work that can be stolen from another thread), the thread may attempt to change its state in the thread state array to "active". In one embodiment, the thread may increment the active thread count to correctly reflect the number of active threads, if the active thread count was decremented by the stealer thread that marked the thread as "stealing". The thread may then perform whatever work it can find to do and check in at the consensus barrier as normal when no more work is found for it to perform. If no work is left to do, then the thread may terminate or go back into a dormant state.

Using an embodiment of this barrier synchronization mechanism for work-stealing threads, "tardy" threads (threads that, for some reason, are not started by the scheduler in a timely manner) may not prevent the active threads from performing all the work and rendezvousing on the consensus barrier. When all work is completed, the consensus barrier (active thread count) indicates that all threads have checked in, even if one or more threads have not been started by the scheduler. The "stop world" operation may then be ended, allowing any suspended applications to continue operations.

Thus, embodiments of the barrier synchronization mechanism enable work-stealing consensus barriers to reach a consensus that all worker threads have rendezvoused even if some worker threads were never scheduled/started by the scheduler. Embodiments may provide a simpler, and faster, rendezvous mechanism for work-stealing threads than conventional mechanisms. This may be especially advantageous for smaller tasks, but note that these advantages may extend to larger tasks as well. Embodiments also provide a simple summary structure (the thread state array) that may be examined by stealing threads to identify possible victims while minimizing the impact on the stealing threads' hardware caches, which may be beneficial, for example, on a processor supporting multiple hardware threads or cores sharing a cache that has limited cache set-associativity such as the Niagara CMT processor.

Embodiments of the barrier synchronization mechanism may be particularly useful, for example, for garbage collectors and similar mechanisms whose parallel phases are sufficiently short in duration that scheduling of threads may have a significant impact on scaling. While garbage collection is used as an exemplary application for embodiments of the barrier synchronization mechanism, note that embodiments may be used in any multithreaded process configured to allocate portions of a task to multiple threads.

FIGS. 3A through 3G illustrate an exemplary barrier synchronization mechanism for scheduling three worker threads to perform a task apportioned to the threads into several "subtasks" stored in deques during an exemplary "stop world" operation, and using a thread state array and consensus barrier with active thread count to rendezvous the threads, including threads that never wake up, according to one embodiment. Note that, in one embodiment, the threads depicted in FIGS. 3A through 3G may be worker threads of a garbage collection mechanism, as previously described. Also note that, while deques are used as an exemplary mechanism for storing subtasks to be performed by worker threads, some embodiments may use other mechanisms to store subtasks for worker threads.

Figure 3A:
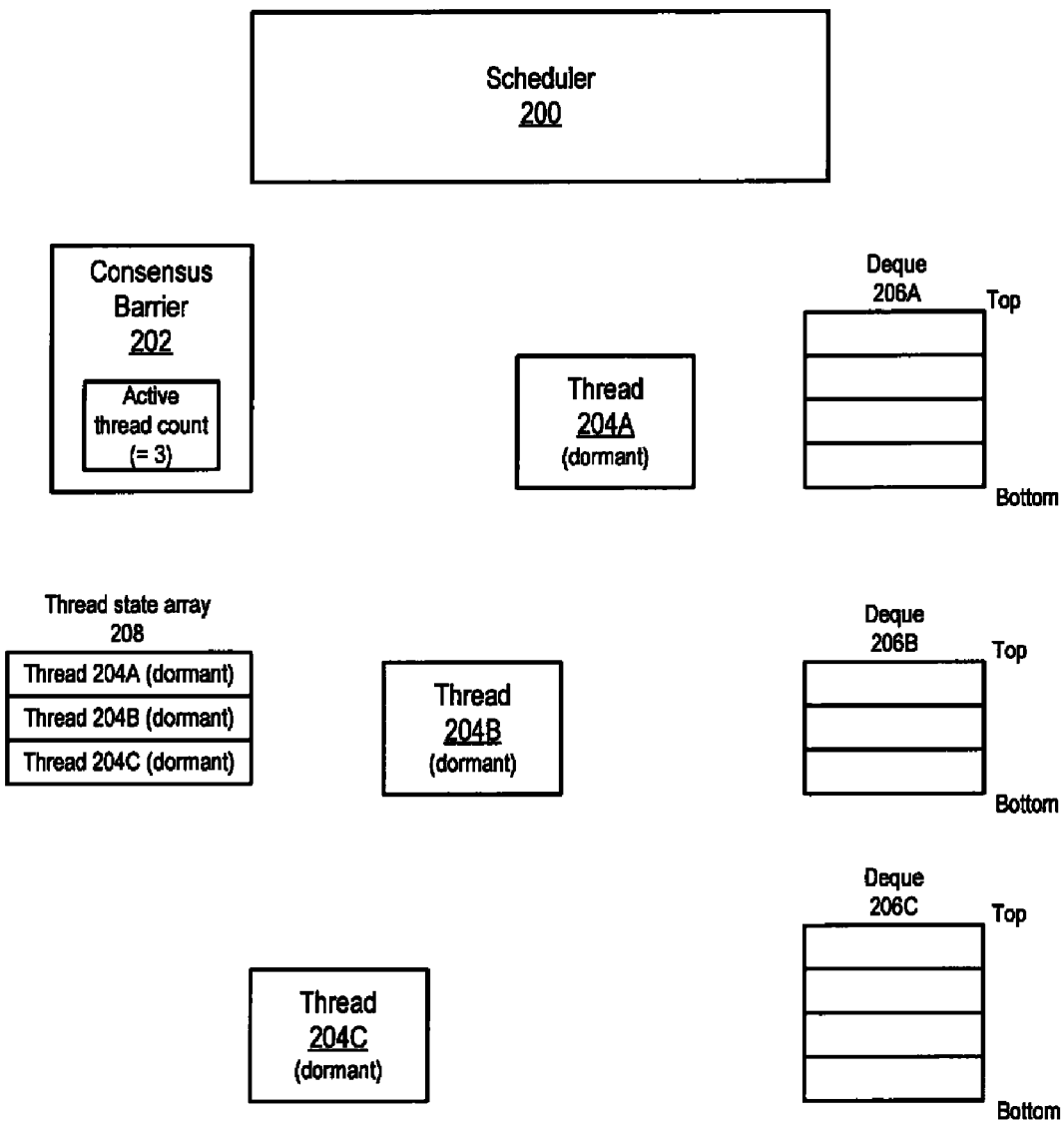
FIGS. 3A through 3G illustrate an exemplary barrier synchronization mechanism for scheduling three worker threads to perform a task apportioned to the threads into several "subtasks" stored in deques during an exemplary "stop world" operation, and using a thread state array and consensus barrier with active thread count to rendezvous the threads, including threads that never wake up, according to one embodiment.

In FIG. 3A, at the start of a task, work may be distributed to the worker threads before the worker threads are started. Note that worker threads may instead or in addition to the above accumulate work by taking from a global/shared source (for example, the scanning of thread stacks and other root sources). Before the worker threads are started, the state of all the threads in the thread state array 208 is "dormant", and the active thread count is 3. In other words, in this example, N is equal to 3.

Figure 3B:
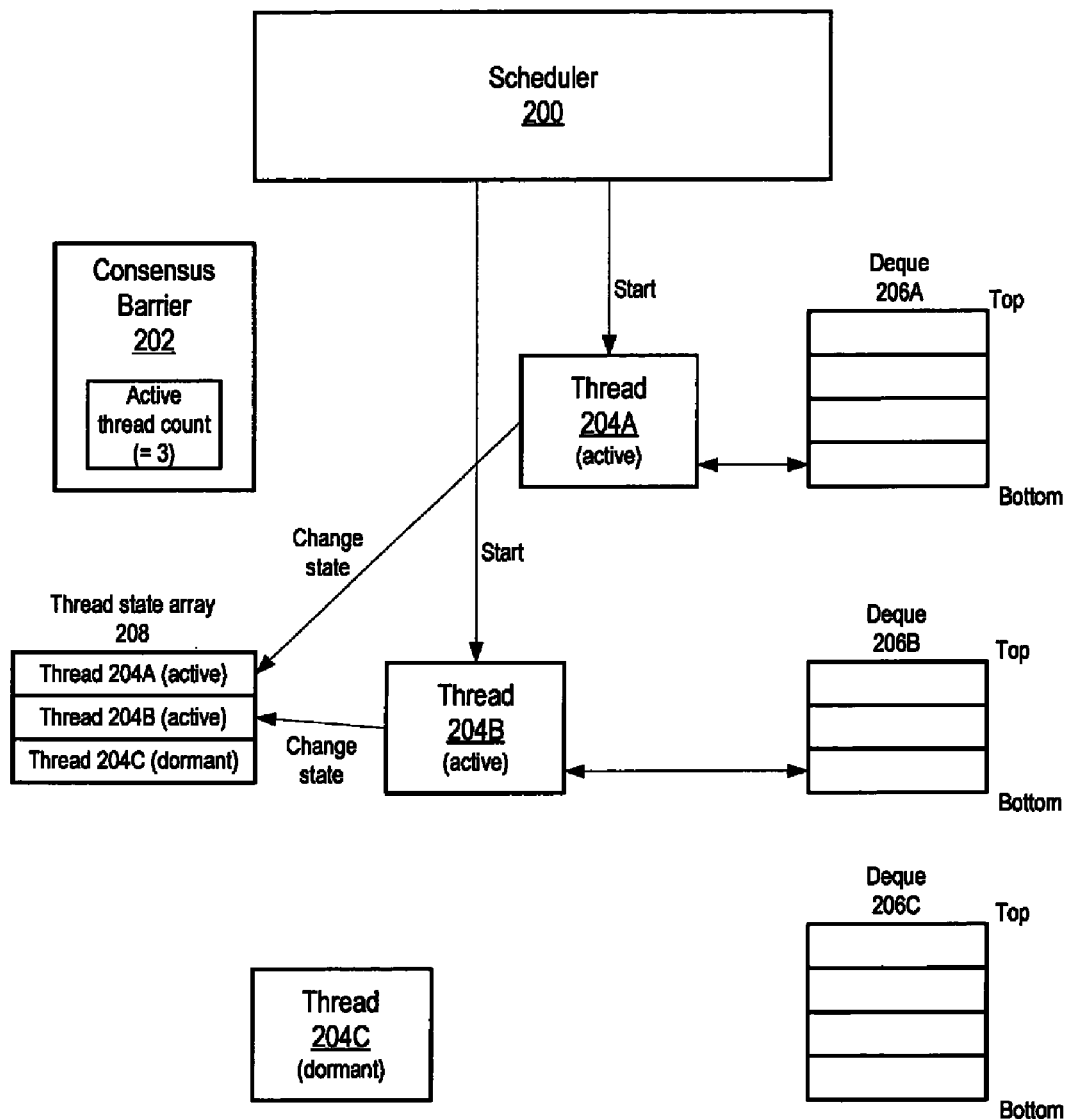

In FIG. 3B, scheduler 200 starts threads 204A and 204B, but for some reason does not start thread 204C. When first scheduled (started), worker threads 204A and 204B may atomically change their states (e.g., using LDSTUB, CAS, or LL/SC) from dormant to active in the thread state array 208. If the change of state is successful, each thread 204 continues and proceeds to perform work (e.g., from subtasks stored in a deque 206 associated with the thread 204).

Figure 3C:
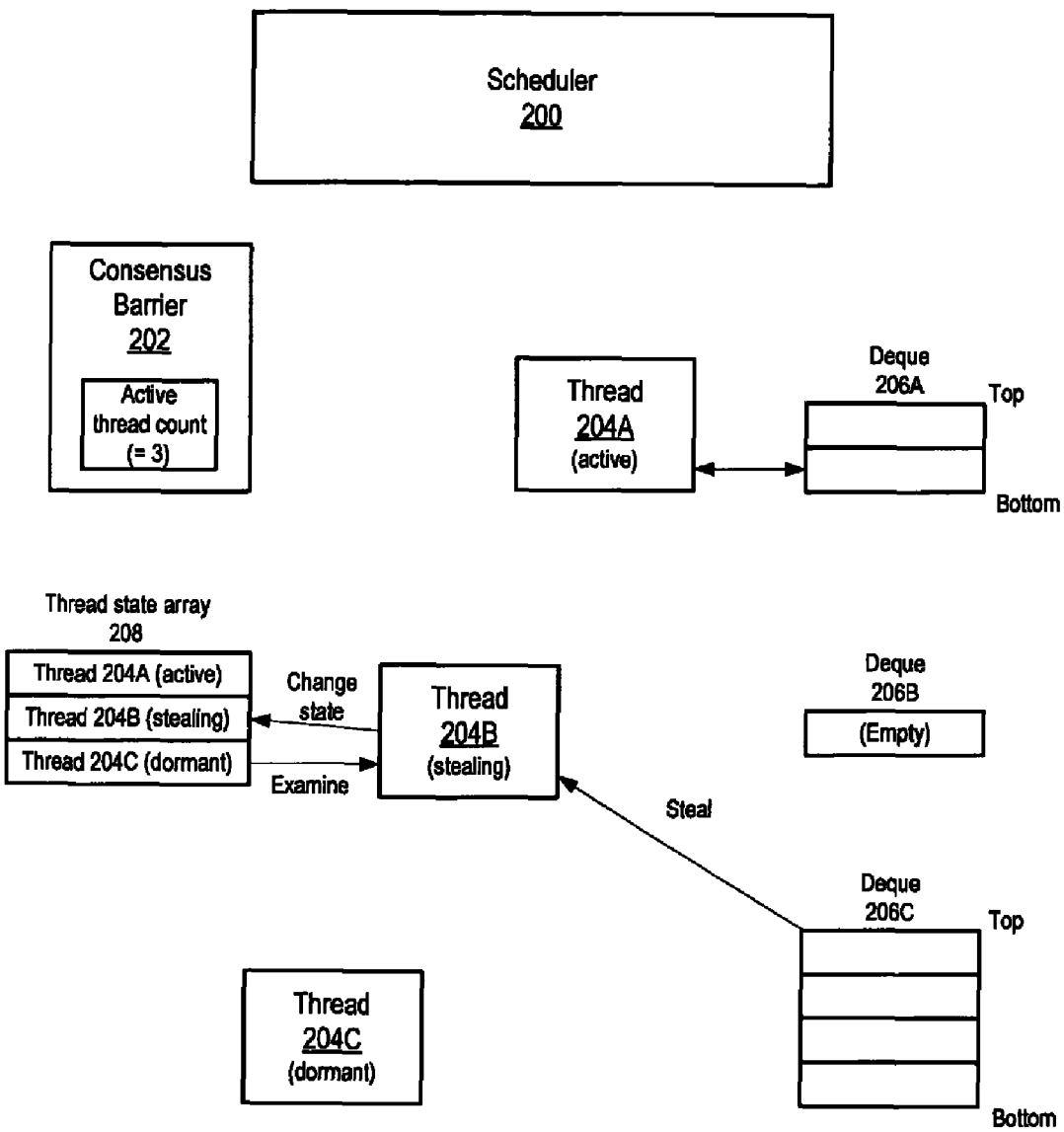

In embodiments, worker threads that exhaust their own sources of work (e.g., subtasks in a deque) may steal work from other "victim" threads. In FIG. 3C, thread 204B has emptied its associated deque 206B, and thus may look for other work to steal from other threads. Note that thread 204B may change its state in thread state array 208 from "active" to "stealing". In one embodiment, worker thread 204B may examine the work assigned to the other threads, for example by examining the threads' associated deques 206. In one embodiment, in finding candidate victim threads, worker thread 204B may examine the thread state array 208 to determine the states of other threads, looking for threads 204 that are either dormant or active (stealing threads may have no more work to do in their own deques).

If a stealer thread finds another (active or dormant) thread that has locally assigned, and stealable, work, the thread may attempt to steal work from the other thread. In FIG. 3C, thread 204B finds work to do in dormant thread 204C's deque 206C, and steals work from the deque by "popping" tasks off the top of the deque 206C. Note that thread 204B may also steal work from active thread 204A's deque 206A. Also note that, if thread 204B does find work to steal from another thread, thread 204B may change its state in thread state array 208 to indicate that it is active (and may again change its state back to "stealing" when the stolen work is completed).

In one embodiment, after thread 204B locates another thread 204C with work on its deque 206C, thread 204B may increment the active thread count and then attempt to steal for from the deque 206C. If thread 204B is successful in stealing work from the deque, the active thread count thus reflects that thread 204B is active. If thread 204B fails in stealing work from the deque, thread 204B may then decrement the active thread count and again looks for a victim thread to attempt from which to steal work.

Figure 3D:
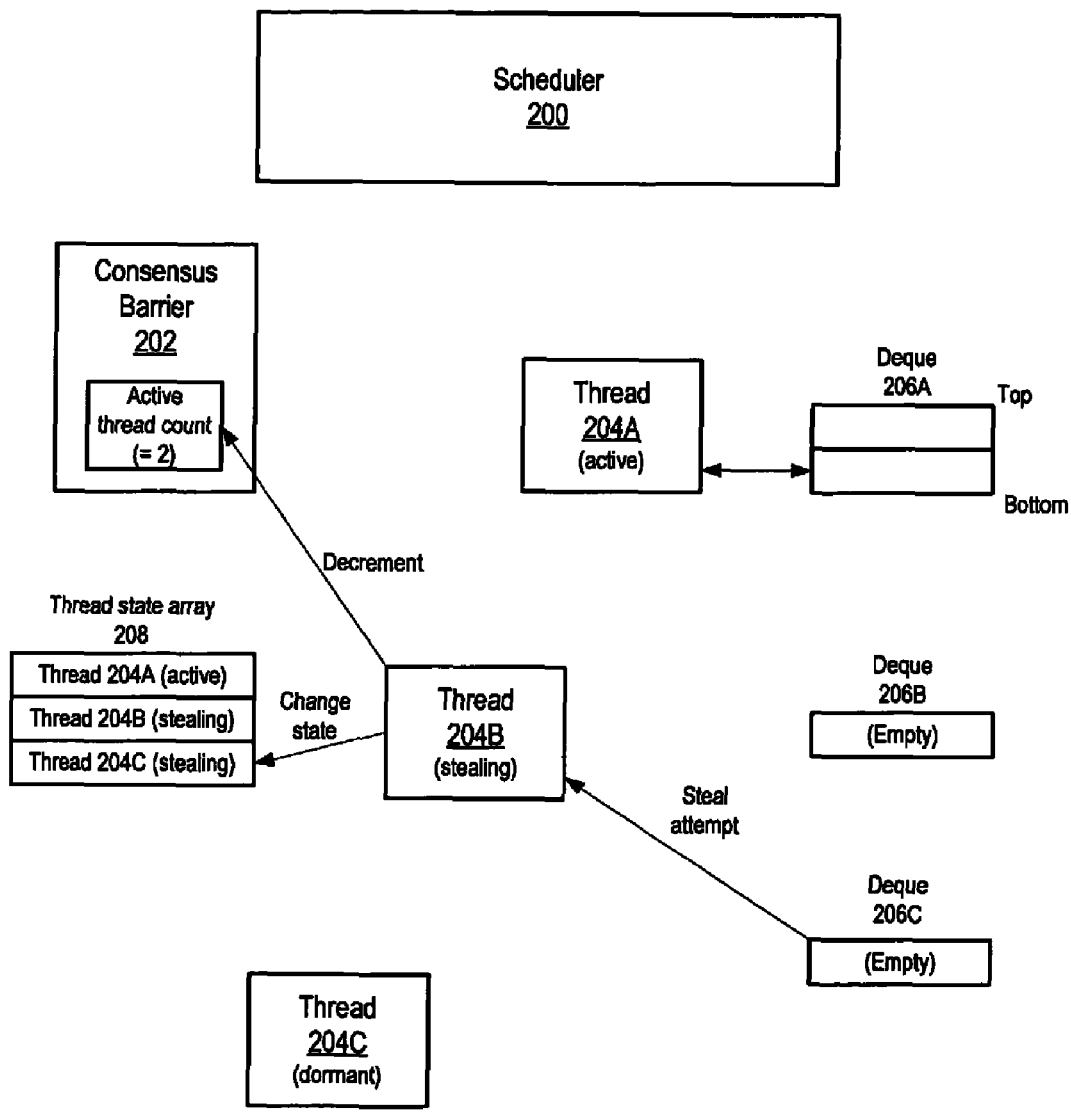
Figure 3E:
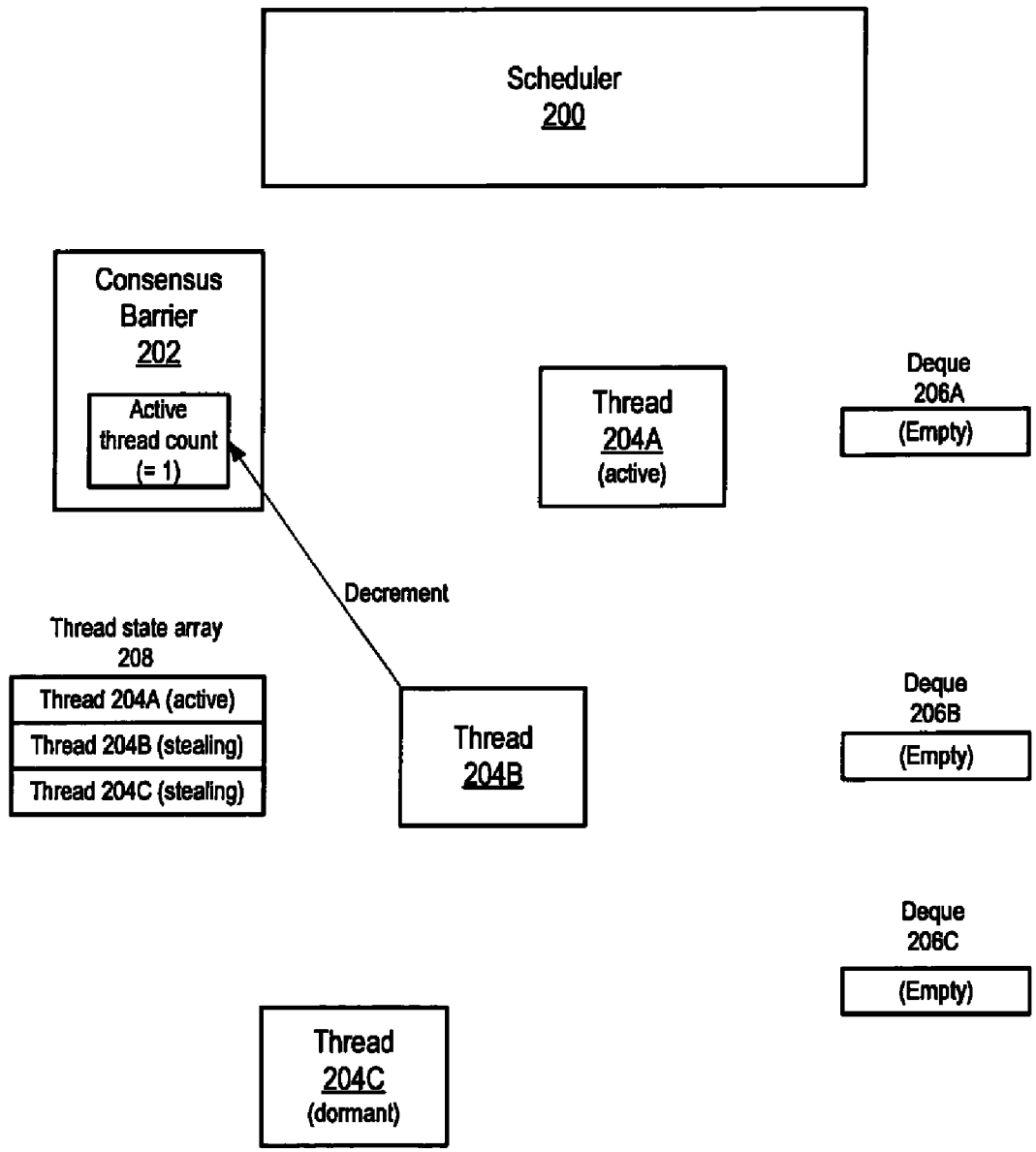

If a stealer thread finds a potential victim thread that does not have work available (e.g., if its deque 206 is empty), and the victim thread is in a "dormant" state as indicated by the thread state array 208, the stealing thread may compete to atomically change that victim thread's state in the thread state array to "stealing". In FIG. 3D, thread 204B may examine the state of thread 204C in thread state array 208 to determine that thread 204C is dormant, and may examine the deque 206C associated with thread 204C, determining that thread 204C has no more work to be performed in deque 206C. In FIG. 3E, thread 204B may change the state of thread 204C to "stealing" in thread state array 208, and in one embodiment may decrement the consensus barrier 202 active thread count, which now indicates two active threads. This effectively "checks in" thread 204C. Note that, in FIG. 3D, thread 204A is still active and performing work from its deque 206A.

In another embodiment, thread 204B may just change the state of the victim thread to "stealing" and not immediately decrement the active thread count. In one embodiment, a thread (possibly, but not necessarily, the same thread) or, alternatively, some other process may check the state of the threads in the thread state array and, if all threads are in the "stealing" state, decrement the active count accordingly.

Note that, if thread 204C subsequently "wakes up" (e.g., is started by scheduler 200), the thread 204C may check its state in thread state array 208 and determine that it is in a stealing state, and thus know that it has been checked in at the consensus barrier 202 by another thread 204. In one embodiment, if there is still work to be done, thread 204C may then try to steal work itself, and in one embodiment may correct (increment) the active thread count to indicate that it is now "active", later decrementing the active thread count when it can find no more work to do. Note that, in one embodiment, if thread 204C finds work to do, it may change its state to "active" in the thread state array 208 while performing the work.

Figure 3F:
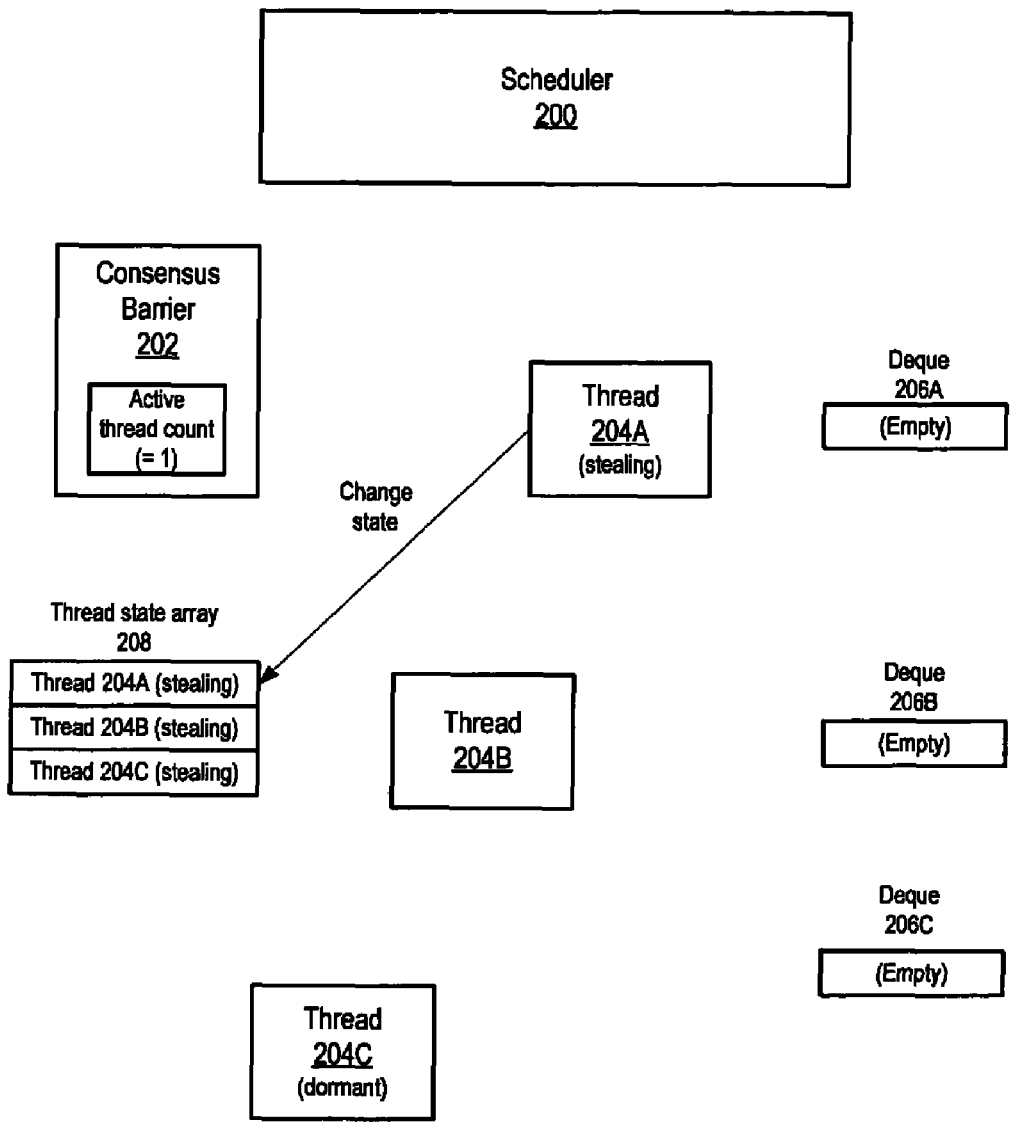
Figure 3G:
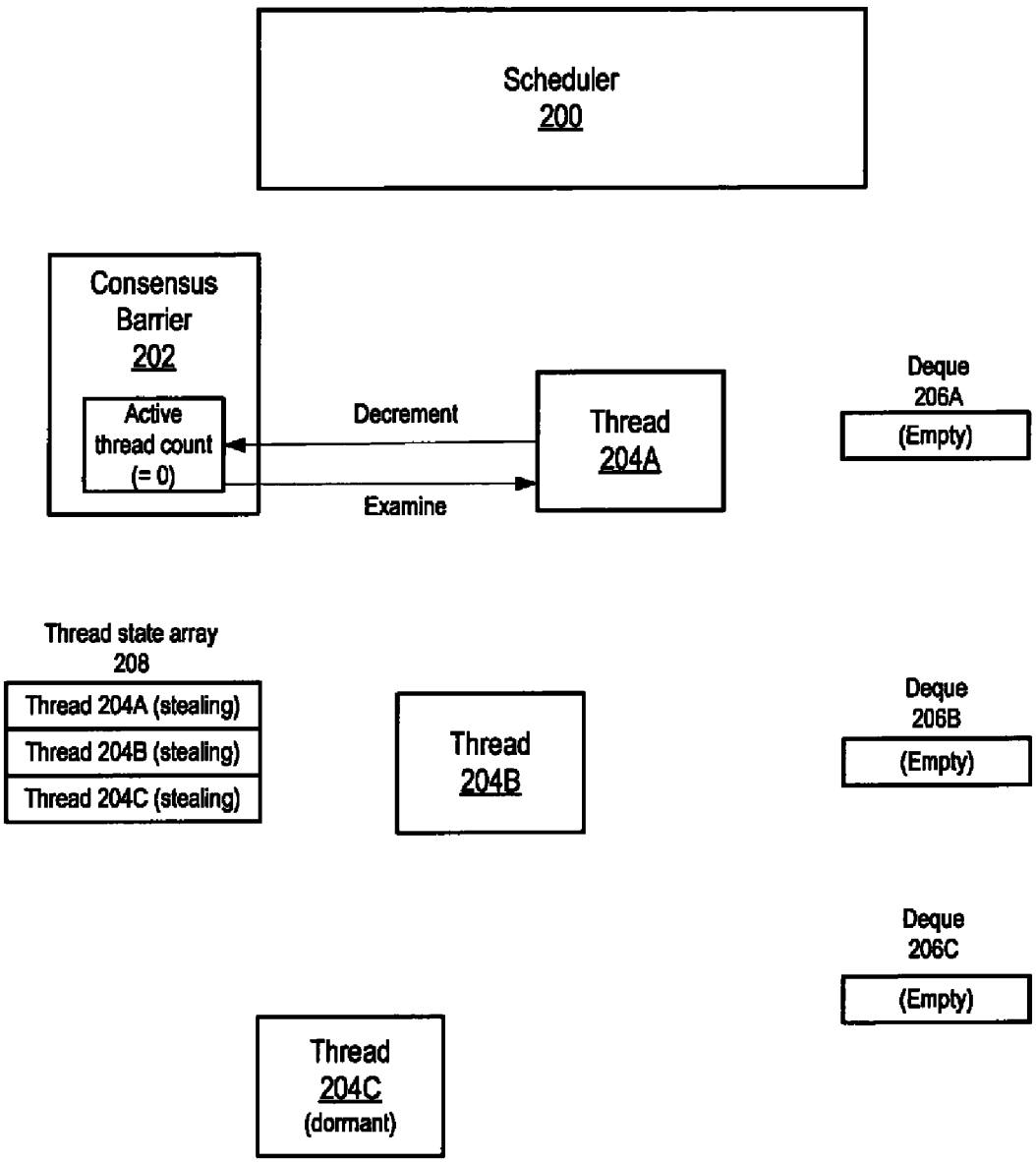

In FIG. 3E, thread 204B may find no more work to steal. Thread 204B may thus check itself in at the consensus barrier 202 by decrementing the active thread count, which now indicates one active thread (thread 204A). In FIG. 3F, thread 204A may exhaust its deque 206A, finishing the last subtask from the deque, and thus may change its state to "stealing" in the thread state array 208. In FIG. 3G, thread 204A may thread 204A may check itself in at the consensus barrier 202 by decrementing the active thread count, which now indicates zero active threads. Thread 204A may then atomically examine the active thread count and, finding that the count is zero, determine that there is no more work to be performed.

Note that FIGS. 3A through 3G illustrate an exemplary embodiment, and are not intended to be limiting. Also note that the order of the operations in FIGS. 3A and 3G may be different. For example, thread 204A may check itself in before thread 204B checks itself (or thread 204C) in at the consensus barrier 202.

Once the active thread count has been decremented to "0", the system knows that the task is complete, and thus the "stop world" process may be ended and any suspended applications may resume work. Also note that this may occur even though one or more threads, such as thread 204C, never "woke up" and thus never checked in at the consensus barrier 202, instead being checked in by one or more other threads. Thus, using embodiments of the barrier synchronization mechanism, threads that remain dormant for an inordinate amount of time do not prevent the task from being completed, and do not cause the consensus barrier to prevent suspended applications from restarting once the overall task has been completed.

Figure 4A:
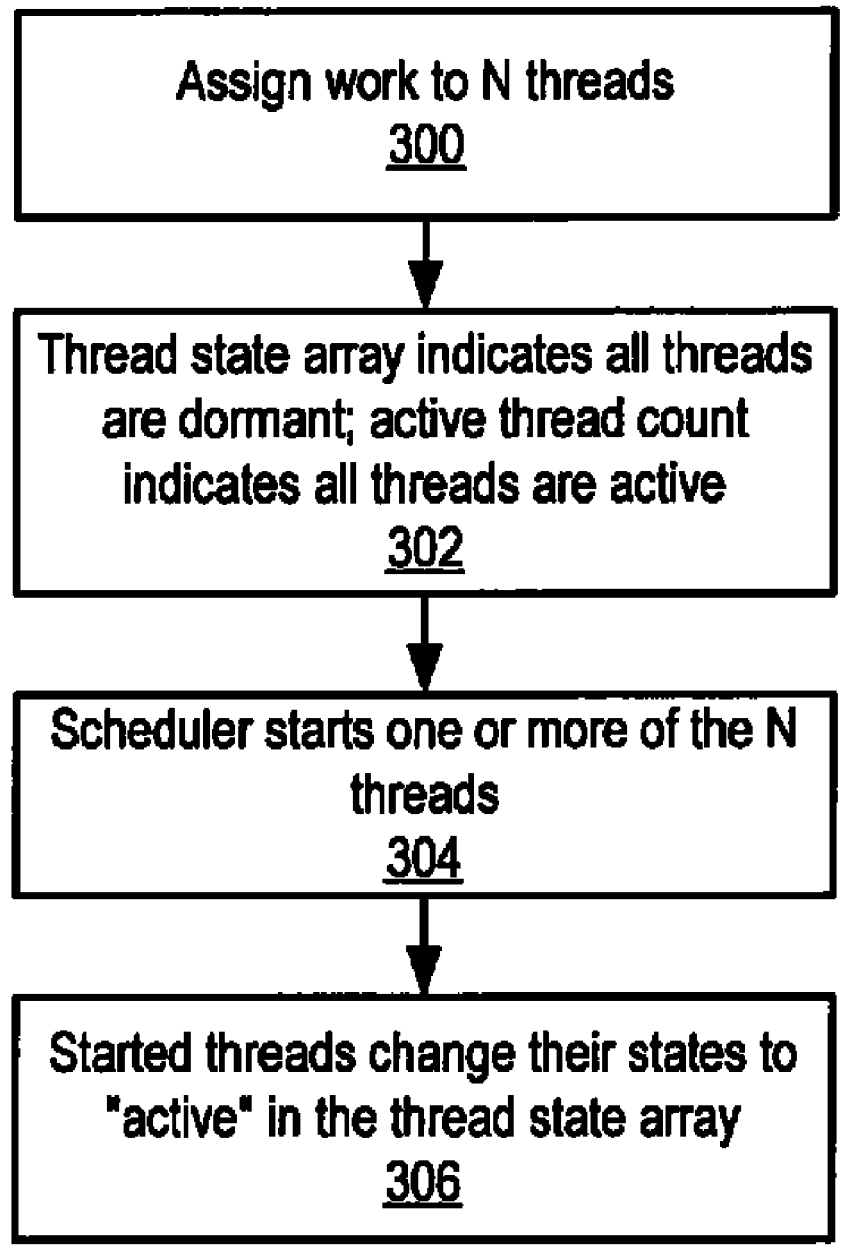
FIGS. 4A and 4B are flowcharts of a barrier synchronization method for a multithread process such as a multithreaded garbage collector mechanism according to one embodiment.
Figure 4B:
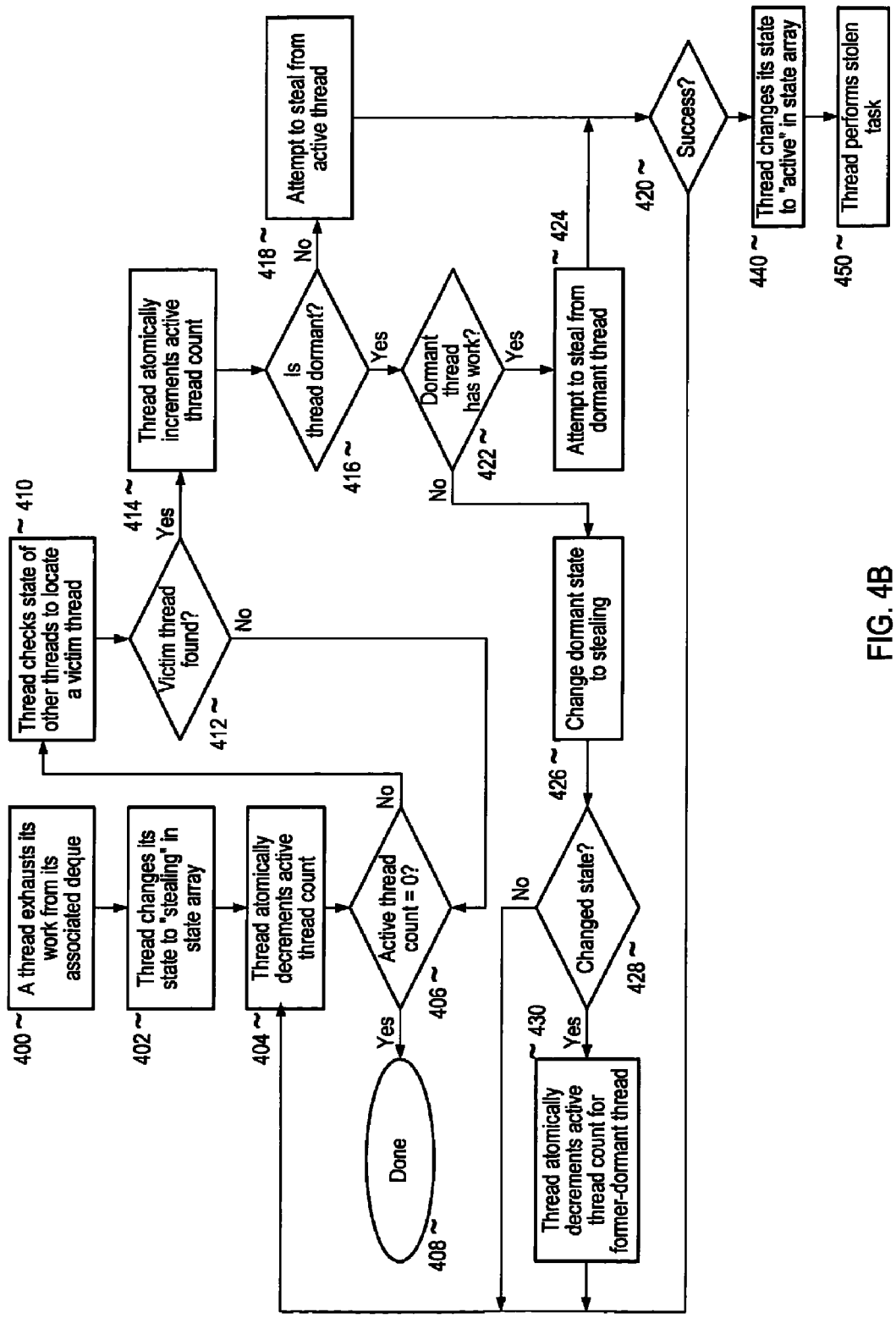

FIGS. 4A and 4B are flowcharts of a barrier synchronization method for a multithread process such as a multithreaded garbage collector mechanism according to one embodiment. FIG. 4A is a flowchart of the initial configuration and initiation of the process. As indicated at 300, initially, subtasks of a task to be performed may be apportioned among N threads. In one embodiment, each thread may have an associated deque (or other structure) for storing subtasks to be performed. As indicated at 302, initially, the thread state array indicates that all threads are "dormant", and the active thread count of the consensus barrier indicates that all threads are active (i.e. the active thread count is initially N).

As indicated at 304, a scheduler starts one or more of the N threads. Note that the process may be a "stop world" process in which, for example, an application is suspended while the process is being performed by the threads. As indicated at 306, the started threads may atomically change their states to "active" in the thread state array.

Typically, the scheduler may start all of the N threads. When a thread completes its work (which may include stealing available work from other threads, in the process of which a thread may change its state to "stealing" in the thread state array), the thread checks in at a consensus barrier (e.g., by decrementing the active thread count). When all threads have completed all work, and all of the threads have checked in at the consensus barrier (e.g., decrementing the active thread count to 0), the task is complete, and the "stop world" operation is ended, and thus any suspended applications may be allowed to resume operation.

However, it is possible that one or more of the threads may not be started by the scheduler for some reason, and thus may remain in a "dormant" state in the thread state array. For example, the scheduler may be a component of a larger overall system, and may be interrupted to manage threads for other processes, including system threads and other application threads. Thus, embodiments of the barrier synchronization mechanism may provide a mechanism for "stealing" threads to check in dormant threads that have no work left to do at the consensus barrier, allowing the "stop world" process to complete, and applications to resume, in a timely manner.

FIG. 4B illustrates a method for a thread that exhausts its work to "steal" work from other threads, and in so doing to attempt to "check in" dormant threads that have no work left to do at the consensus barrier, if any such dormant threads are found. In embodiments, the consensus barrier tracks the number of active threads as an active thread count. The active thread count is initialized to N, where N represents the total number of threads that have been apportioned work for the task. During execution of the task by the threads, an active thread count of 0 indicates to all threads that all work has been done and thus the task is complete. Note that the thread state array may be more difficult to check in the same way and for the same purpose because the contents of the array cannot typically be examined in their entirety atomically. Instead, in one embodiment, stealing threads may use the active thread count maintained at the consensus barrier to determine when to stop work on the task, as well as to indicate that they are about to steal.

As indicated at 400, a thread may exhaust the work from its associated deque. As indicated at 402, the thread may become a "stealing" thread, and in so doing may atomically change its state to "stealing" in the thread state array. As indicated at 404, the stealing thread may then decrement the active thread count to indicate that it is stealing and not active. As indicated at 406, the stealing thread may then atomically check the active thread count and, if the active thread count is 0, the thread knows that the task is complete (i.e., that all other threads have checked in or been checked in at the consensus barrier), and so no further action may be required of the thread, as indicated at 408.

At 406, if the active thread count is greater than zero, then, in one embodiment, as indicated at 410, the thread may then check the state of other threads in the thread state array looking for a potential victim thread (a dormant or active thread) to steal work from. Note that "stealing" threads typically do not have stealable work, and so in one embodiment the "stealing" thread may ignore all threads whose state is "stealing" in the thread state array. Also note that, in another embodiment, the "stealing" thread may examine the deques of other threads to see if any threads have stealable work, and if a thread is found that does have stealable work, the "stealing" thread may then check the potential victim thread's state in the thread state array.

The stealing thread may or may not find a dormant or an active thread as a potential victim to steal work from, as indicated at 412. If, at 412, a victim thread is not found, then the stealing thread may return to 406 to check the active thread count, and proceed again from there according to the value of the active thread count. In one embodiment, a thread returning to 406 may keep track of the number of attempts to locate a victim thread and, in some embodiments, may use an exponential-backoff delay technique for which the duration increases as the number of repeated attempts increases. If, at 412, a victim thread is found, then the stealing thread increments the active thread count at the consensus barrier, as indicated at 414. This may indicate that the stealing thread potentially may find more work to do, and may indicate to other threads that may check the consensus barrier that the task may not be complete.

At 416, if the stealing thread determines that the thread being examined is an active thread as indicated by the entry for the thread in the thread state array, the stealing thread may attempt to steal work from the active thread, if any is available, as indicated at 418. At 420, if the steal attempt is successful, then the stealing thread may atomically change its state in the thread state array to "active" as indicated at 440, and then may begin work on the stolen task as indicated at 450. In one embodiment, the stealing thread may atomically change its state in the thread state array to "active" after a successful steal. In another embodiment, the stealing thread may atomically change its state in the thread state array to "active" when the first work item is generated and pushed onto its deque. At 420, if the steal attempt is not successful, then the stealing thread may atomically decrement the active thread count at the consensus barrier, as indicated at 404, and continue again from there.

At 416, if the stealing thread determines that the thread being examined is a dormant thread as indicated by the entry for the thread in the thread state array, the stealing thread may determine if the dormant thread has any work in its deque that may be stealable, as indicated at 422. If, at 422, the dormant thread does have work in its deque, then the stealing thread may attempt to steal work from the dormant thread, as indicated at 424. At 420, if the steal attempt is successful, then the stealing thread may begin work on the stolen task, as indicated at 450. At 420, if the steal attempt is not successful, then the stealing thread may atomically decrement the active thread count at the consensus barrier, as indicated at 404, and continue again from there.

If, at 422, the dormant thread does not have any work in its deque, then the stealing thread may attempt to change the dormant thread's state to "stealing" in the thread state array, as indicated at 426. At 428, if the attempt to change the dormant thread's state to stealing is not successful, then the stealing thread may atomically decrement the active thread count (for itself) at the consensus barrier, as indicated at 404, and continue again from there. At 428, if the attempt to change the dormant thread's state to stealing is successful, the stealing thread may then decrement the active thread count for the formerly dormant, now "stealing", thread to effectively check in the thread at the consensus barrier, as indicated at 430. The stealing thread may then atomically decrement the active thread count (for itself) at the consensus barrier, as indicated at 404, and continue again from there. Thus, a "workless" dormant thread may be checked in by another (stealing) thread, and will thus not prevent the "stop world" process from completing while waiting for the dormant thread to wake up and check in.

Note that a stealing thread, or more than one stealing thread, may repeatedly steal work from a dormant thread's deque until the dormant thread's deque is empty. A stealing thread that subsequently examines the dormant thread looking for stealable work may then discover that the dormant thread has no more work, and may then attempt to change the dormant thread's state and to check in the dormant thread at the consensus barrier, as described above.

Also note that, in one embodiment, a thread examining the thread state array may discover that all other threads are marked as "stealing", and thus would know that there is no more stealable work. The thread may then check in at the consensus barrier to allow the "stop world" process to end and any suspended applications to resume.

Figure 5:
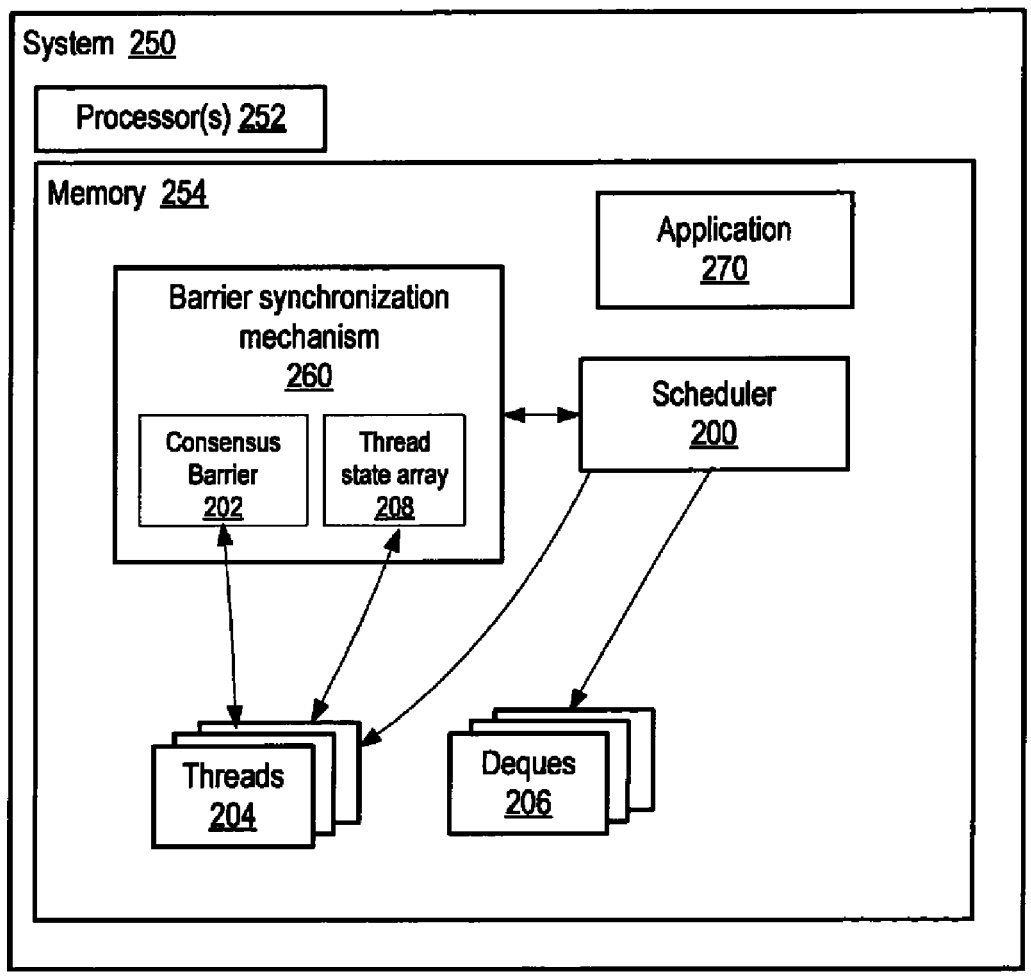
FIG. 5 illustrates a system implementing a barrier synchronization mechanism for a multithread process such as a multithreaded garbage collector mechanism according to one embodiment.

FIG. 5 illustrates a system implementing a barrier synchronization mechanism for a multithread process such as a multithreaded garbage collector mechanism according to one embodiment. System 250 may be any of various types of devices, including, but not limited to, a personal computer system, desktop computer, laptop or notebook computer, server computer, mainframe computer system, workstation, network computer, Portable Digital Assistant (PDA), smartphone, or other suitable device. System 250 may include at least one processor 252. The processor 252 may be coupled to a memory 254. Memory 254 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

System 250 may include, in memory 254, an instance of a barrier synchronization mechanism 260 as described herein. Memory 254 may also include a thread scheduler 200 (which may be part of an operating system on system 250), one or more applications 270, two or more threads 204, and two or more "deques" 206 or other structures for storing tasks to be performed for each thread 204. Barrier synchronization mechanism 260 may allow a "stop world" operation, for example on application 270, being performed by two or more worker threads 204 configured to "steal" work from other threads to complete, even if one or more of the threads 204 are not scheduled/started by the thread scheduler 200 and thus do not rendezvous or "check in" at consensus barrier 202 in a timely manner, even though the task being performed, including portions (subtasks) of the overall task which were assigned to the tardy thread 204, has been completed by the other threads 204.

In embodiments of the barrier synchronization mechanism 260, states of the worker threads 204 may be "memo-ized" or recorded in thread state array 208. In one embodiment, three states for worker threads may be used: dormant, active, and stealing. In one embodiment of the barrier synchronization mechanism, a global active thread count may be used as a countdown consensus barrier. When a thread completes and checks in at the consensus barrier, the active thread count is decremented. When the active thread count indicates that all threads 204 have checked in, the "stop world" operation is completed and any application(s) 270 that are suspended may be allowed to resume operations. Note that, in one embodiment, a "stealing" thread 204 may decrement the active thread count for a dormant thread (a thread that has not started) that has no more work to do.

In one embodiment, at the start of a task, work may be distributed to the N worker threads 204 before the worker threads are started. Before the worker threads are started, the threads 204 are all in a "dormant" state in thread state array 208 and the active thread count is N. In one embodiment, when first scheduled (started), each worker thread may atomically change its state from dormant to active in the thread state array 208. If the change of state is successful, the thread 204 continues and proceeds to perform work (e.g., from subtasks stored in its associated deque 206).

In one embodiment, worker threads 204 that exhaust their own sources of work (e.g., subtasks in a deque 206) may steal work from other "victim" threads. In finding candidate victim threads, a worker thread may examine the thread state array 208 to determine the states of other threads, looking for threads that are either dormant or active (stealing threads may have no more work to do in their deques 206), and may also examine the work assigned to the other threads, for example subtasks in the threads' associated deques 206. If another thread 204 has locally assigned, and stealable, work, the thread may attempt to steal work from the other thread. If a potential victim thread 204 does not have work available (e.g., if its deque 206 is empty), and the victim thread is in a "dormant" state as indicated by the thread state array 208, the stealing thread 204 may compete to atomically change that victim thread's state in the thread state array 208 to "stealing". In one embodiment, if the thread succeeds in changing the state of the victim thread to "stealing", the thread may then decrement the active thread count, effectively "checking in" the victim thread at the consensus barrier 202. In another embodiment, the thread may just change the state of the victim thread to "stealing" and not immediately decrement the active thread count. In one embodiment, a thread (possibly, but not necessarily, the same thread) or, alternatively, some other process may check the state of the threads in the thread state array 208 and, if all threads are in the "stealing" state, decrement the active count accordingly.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A consensus barrier synchronization method for multithreaded processes, comprising:
    apportioning a plurality of subtasks of a task among N threads, where N is an integer greater than one, and wherein each thread is apportioned one or more of the subtasks;
    initializing a state for each of the N threads in a thread state array to indicate that each of the N threads is dormant;
    initializing an active thread count for the task to N, wherein the active thread count acts as a consensus barrier for the N threads;
    a scheduler process starting one or more of the N threads, wherein at least one of the N threads is not started;
    each of the one or more started threads changing its corresponding state in the thread state array to indicate that the respective thread is active, wherein the state in the thread state array of the at least one thread that was not started remains dormant;
    each started thread performing work as indicated by the one or more subtasks which are apportioned to the respective thread, wherein a dormant thread does not perform work;
    at least one of the started threads performing work as indicated by the subtasks which are apportioned to the at least one dormant thread; and
    one of the started threads decrementing the active thread count on behalf of a dormant thread to indicate that the dormant thread has checked in at the consensus barrier, wherein said decrementing comprises:
        determining, by one of the started threads that is a stealing thread, that the dormant thread has no more subtasks to be performed, and
        in response to said determining, the stealing thread decrementing the active thread count to indicate that the dormant thread has checked in at the consensus barrier.

2. The method as recited in claim 1, wherein said changing the corresponding state in the thread state array is performed by a respective thread as an atomic operation.

3. The method as recited in claim 1,
    wherein said at least one of the started threads performing work as indicated by the subtasks which are apportioned to the at least one dormant thread comprises each of the at least one of the started threads changing its corresponding state in the thread state array to indicate that the respective thread is stealing.

4. The method as recited in claim 3, further comprising, in response to said determining, the stealing thread changing the corresponding state of the dormant thread in the thread state array to indicate that the respective thread is in a stealing state.

5. The method as recited in claim 4, wherein said changing the corresponding state of the dormant thread in the thread state array is performed as an atomic operation.

6. The method as recited in claim 1, wherein the active thread count is configured to be decremented to indicate completion of performing work on available subtasks by a thread, and wherein an active thread count of 0 indicates that the task has been completed.

7. The method as recited in claim 1, wherein the thread state array is configured to indicate, for each thread, whether the thread is in a dormant state, and active state, or a stealing state.

8. The method as recited in claim 1, wherein said at least one of the started threads performing work as indicated by the subtasks which are apportioned to the at least one dormant thread comprises:
    one of the started threads completing the one or more subtasks apportioned to the respective started thread;

the started thread changing its corresponding state in the thread state array from active to stealing to indicate that the thread is stealing;

the stealing thread attempting to steal one or more subtasks from other threads of the N threads; and if said attempting to steal one or more subtasks from other threads of the N threads is successful, the stealing thread performing work as indicated by the one or more stolen subtasks.

9. The method as recited in claim 8, further comprising:
prior to said attempting to steal one or more subtasks from other threads of the N threads:
the stealing thread decrementing the active thread count;
the stealing thread locating at least one other thread from which to attempt to steal one or more subtasks; and
the stealing thread incrementing the active thread count; and
if said attempting to steal one or more subtasks from other threads of the N threads is not successful, the stealing thread decrementing the active thread count to indicate that the stealing thread is not active.

10. The method as recited in claim 8, further comprising, if said attempting to steal one or more subtasks from other threads of the N threads is successful, the stealing thread changing its corresponding state in the thread state array to indicate that the respective thread is active.

11. The method as recited in claim 8, wherein said attempting to steal one or more subtasks from other threads of the N threads comprises:
the stealing thread checking the state of the other threads in the thread state array; and
the stealing thread attempting to steal subtasks from one or more threads whose state as indicated by the thread state array is one of active or dormant.

12. The method as recited in claim 8,
wherein the subtasks apportioned to each thread are stored in a deque structure associated with the respective thread; and
wherein successfully stealing one or more subtasks from other threads of the N threads comprises the stealing thread popping at least one subtask off of the top of the deque associated with at least one other thread.

13. The method as recited in claim 1,
wherein said at least one of the started threads performing work as indicated by the subtasks which are apportioned to the at least one dormant thread comprises one of the started threads atomically changing its corresponding state in the thread state array to indicate that the thread is stealing;
wherein said one of the started threads decrementing the active thread count on behalf of a dormant thread to indicate that the dormant thread has checked in at the consensus barrier comprises:
the stealing thread locating one of the other N threads that is in a dormant state as indicated by the thread state array and that has no more subtasks to be performed;
the stealing thread atomically changing the corresponding state of the located dormant thread in the thread state array to indicate that the respective thread is stealing; and
the stealing thread decrementing the active thread count to indicate that the located thread has checked in at the consensus barrier.

14. The method as recited in claim 1,
wherein the subtasks apportioned to each thread are stored in a deque structure associated with the thread; and
wherein each started thread is configured to pop a subtask off of the bottom of the deque structure associated with the respective thread to perform work indicated by the particular subtask.

15. The method as recited in claim 14, further comprising:
one of the started threads generating one or more additional subtasks to be performed while work is being performed according to one of the subtasks popped from the associated deque structure; and
the started thread pushing the one or more additional subtasks to be performed onto the bottom of the associated deque structure.

16. The method as recited in claim 1, wherein the task is garbage collection for a process, and wherein the threads are garbage collector worker threads.

17. The method as recited in claim 1, wherein the task is performed during a stop world operation in which another process is suspended for the duration of the task.

18. The method as recited in claim 17, wherein the stop world operation ends when each of the N threads have rendezvoused at the consensus barrier by decrementing the active thread count for each thread when the respective thread has no more subtasks available to perform, and wherein the other process is resumed when the stop world operation ends.

19. A system, comprising:
one or more processors; and
a memory comprising program instructions, wherein the program instructions are executable by the one or more processors to:
implement N threads to perform a task on the system, where N is an integer greater than one;
apportion a plurality of subtasks of the task to be performed on the system among the N threads, wherein each thread is apportioned one or more of the subtasks;
initialize a state for each of the N threads in a thread state array to indicate that each of the N threads is dormant;
initialize an active thread count for the task to N, wherein the active thread count acts as a consensus barrier for the N threads;
start one or more of the N threads, wherein at least one of the N threads is not started, and wherein each started thread is configured to:
change its corresponding state in the thread state array to indicate that the thread is active; and
perform work on the system as indicated by the one or more subtasks which are apportioned to the thread;
wherein the state in the thread state array of the at least one thread that was not started remains dormant, wherein a dormant thread does not perform work, and wherein at least one of the started threads performs work as indicated by the subtasks which are apportioned to the at least one dormant thread; and
wherein one of the started threads decrements the active thread count on behalf of a dormant thread to indicate that the dormant thread has checked in at the consensus barrier;
wherein, to decrement the active thread count on behalf of a dormant thread, the one of the started threads determines that the dormant thread has no more subtasks to be performed, and, in response to said determining, decrements the active thread count to indicate that the other thread has checked in at the consensus barrier.

20. The system as recited in claim 19, wherein, to change its corresponding state in the thread state array, the thread is configured to perform said change as an atomic operation.

21. The system as recited in claim 19,
wherein, to perform work as indicated by the subtasks which are apportioned to the at least one dormant thread, a started thread is configured to change its corresponding state in the thread state array to indicate that the thread is stealing.

22. The system as recited in claim 21, wherein, in response to said determining, the stealing thread is further configured to change the corresponding state of the dormant thread in the thread state array to indicate that the respective thread is in a stealing state.

23. The system as recited in claim 22, wherein, to change the corresponding state of the dormant thread in the thread state array, the thread is configured to perform said change as an atomic operation.

24. The system as recited in claim 19, wherein the active thread count is configured to be decremented to indicate completion of performing work on available subtasks by a thread, and wherein an active thread count of 0 indicates that the task has been completed.

25. The system as recited in claim 19, wherein the thread state array is configured to indicate, for each thread, whether the thread is in a dormant state, and active state, or a stealing state.

26. The system as recited in claim 19, wherein, to perform work as indicated by the subtasks which are apportioned to the at least one dormant thread, a started threads is configured to:
change its corresponding state in the thread state array to indicate that the thread is stealing after completion of the one or more subtasks apportioned to the thread;
attempt to steal one or more subtasks from other threads of the N threads; and
if one or more subtasks are successfully stolen from the other threads, perform work on the system as indicated by the one or more stolen subtasks.

27. The system as recited in claim 26, wherein each of the started threads is further configured to:
prior to said attempt to steal one or more subtasks from other threads of the N threads:
decrement the active thread count;
locate at least one other thread from which to attempt to steal one or more subtasks; and
increment the active thread count;
if said attempt to steal one or more subtasks from other threads of the N threads is successful, decrement the active thread count to indicate that the thread is not active.

28. The system as recited in claim 26, wherein each of the started threads is further configured to, if said attempt to steal one or more subtasks from other threads of the N threads is successful, change its corresponding state in the thread state array to indicate that the respective thread is active.

29. The system as recited in claim 26, wherein, to attempt to steal one or more subtasks from other threads of the N threads, the started thread is further configured to:
check the state of the other threads in the thread state array; and
attempt to steal subtasks from one or more threads whose state as indicated by the thread state array is one of active or dormant.

30. The system as recited in claim 26,
wherein the subtasks apportioned to each thread are stored in a deque structure associated with the respective thread; and
wherein, to steal a subtask from another thread, the stealing thread is configured to pop the subtask off of the top of the deque associated with the other thread.

31. The system as recited in claim 19, wherein, to perform work as indicated by the subtasks which are apportioned to the at least one dormant thread, a started thread is configured to atomically change its corresponding state in the thread state array to indicate that the thread is stealing; and
wherein, to decrement the active thread count on behalf of a dormant thread to indicate that the dormant thread has checked in at the consensus barrier, the stealing thread is configured to:
locate one of the other N threads that is in a dormant state as indicated by the thread state array and that has no more subtasks to be performed;
atomically change the corresponding state of the located dormant thread in the thread state array to indicate that the respective thread is stealing; and
decrement the active thread count to indicate that the located thread has checked in at the consensus barrier.

32. The system as recited in claim 19,
wherein the subtasks apportioned to each thread are stored in a deque structure associated with the thread; and
wherein each started thread is further configured to pop a subtask off of the bottom of the deque structure associated with the respective thread to perform work indicated by the particular subtask.

33. The system as recited in claim 32, wherein each of the started threads is further configured to:
generate one or more additional subtasks to be performed while work is being performed according to one of the subtasks popped from the associated deque structure; and
push the one or more additional subtasks to be performed onto the bottom of the associated deque structure.

34. The system as recited in claim 19, wherein the task is garbage collection for a process on the system, and wherein the threads are garbage collector worker threads.

35. The system as recited in claim 19, wherein the task is performed during a stop world operation in which another process on the system is suspended for the duration of the task.

36. The system as recited in claim 35, wherein the stop world operation ends when each of the N threads have rendezvoused at the consensus barrier by decrementing the active thread count for each thread when the respective thread has no more subtasks available to perform, and wherein the other process is resumed when the stop world operation ends.

37. A non-transitory computer-accessible medium comprising program instructions, wherein the program instructions are configured to implement:
apportioning a plurality of subtasks of a task among N threads, where N is an integer greater than one, and wherein each thread is apportioned one or more of the subtasks;
initializing a state for each of the N threads in a thread state array to indicate that each of the N threads is dormant;
initializing an active thread count for the task to N, wherein the active thread count acts as a consensus barrier for the N threads;
a scheduler process starting one or more of the N threads, wherein at least one of the N threads is not started;

each of the one or more started threads changing its corresponding state in the thread state array to indicate that the respective thread is active, wherein the state in the thread state array of the at least one thread that was not started remains dormant;

each started thread performing work as indicated by the one or more subtasks which are apportioned to the respective thread, wherein a dormant thread does not perform work;

at least one of the started threads performing work as indicated by the subtasks which are apportioned to the at least one dormant thread; and one of the started threads decrementing the active thread count on behalf of a dormant thread to indicate that the dormant thread has checked in at the consensus barrier, wherein said decrementing comprises:
    determining, by one of the started threads that is a stealing thread, that the dormant thread has no more subtasks to be performed, and
    in response to said determining, the stealing thread decrementing the active thread count to indicate that the dormant thread has checked in at the consensus barrier.

38. The non-transitory computer-accessible medium as recited in claim 37, wherein, in said changing the corresponding state in the thread state array, the program instructions are further configured to implement performing said change as an atomic operation.

39. The non-transitory computer-accessible medium as recited in claim 37,
    wherein, in said at least one of the started threads performing work as indicated by the subtasks which are apportioned to the at least one dormant thread, the program instructions are configured to implement each of the at least one of the started threads changing its corresponding state in the thread state array to indicate that the thread is stealing.

40. The non-transitory computer-accessible medium as recited in claim 39, wherein the program instructions are configured to implement, in response to said determining, the stealing thread changing the corresponding state of the dormant thread in the thread state array to indicate that the respective thread is in a stealing state.

41. The non-transitory computer-accessible medium as recited in claim 40, wherein, in said changing the corresponding state of the dormant thread in the thread state array, the program instructions are configured to implement performing said change as an atomic operation.

42. The non-transitory computer-accessible medium as recited in claim 37, wherein the active thread count is configured to be decremented to indicate completion of performing work on available subtasks by a thread, and wherein an active thread count of 0 indicates that the task has been completed.

43. The non-transitory computer-accessible medium as recited in claim 37, wherein the thread state array is configured to indicate, for each thread, whether the thread is in a dormant state, and active state, or a stealing state.

44. The non-transitory computer-accessible medium as recited in claim 37, wherein, in said at least one of the started threads performing work as indicated by the subtasks which are apportioned to the at least one dormant thread, the program instructions are further configured to implement:
    one of the started threads completing the one or more subtasks apportioned to the respective started thread;
    the started thread changing its corresponding state in the thread state array from active to stealing to indicate that the thread is stealing;
    the stealing thread attempting to steal one or more subtasks from other threads of the N threads; and
    if said attempting to steal one or more subtasks from other threads of the N threads is successful, the stealing thread performing work as indicated by the one or more stolen subtasks.

45. The non-transitory computer-accessible medium as recited in claim 44, wherein the program instructions are further configured to implement:
    prior to said attempting to steal one or more subtasks from other threads of the N threads:
        the stealing thread decrementing the active thread count;
        the stealing thread locating at least one other thread from which to attempt to steal one or more subtasks; and
        the stealing thread incrementing the active thread count; and
    if said attempting to steal one or more subtasks from other threads of the N threads is not successful, the stealing thread decrementing the active thread count to indicate that the stealing thread is not active.

46. The non-transitory computer-accessible medium as recited in claim 44, wherein the program instructions are further configured to implement, if said attempting to steal one or more subtasks from other threads of the N threads is successful, the stealing thread changing its corresponding state in the thread state array to indicate that the respective thread is active.

47. The non-transitory computer-accessible medium as recited in claim 44, wherein, in said attempting to steal one or more subtasks from other threads of the N threads, the program instructions are further configured to implement:
    the stealing thread checking the state of the other threads in the thread state array; and
    the stealing thread attempting to steal subtasks from one or more threads whose state as indicated by the thread state array is one of active or dormant.

48. The non-transitory computer-accessible medium as recited in claim 44,
    wherein the subtasks apportioned to each thread are stored in a deque structure associated with the respective thread; and
    wherein, in stealing a subtask from another thread, the program instructions are configured to implement the stealing thread popping at least one subtask off of the top of the deque associated with at least one other thread.

49. The non-transitory computer-accessible medium as recited in claim 37,
    wherein, in said at least one of the started threads performing work as indicated by the subtasks which are apportioned to the at least one dormant thread, the program instructions are configured to implement one of the started threads atomically changing its corresponding state in the thread state array to indicate that the thread is stealing;
    wherein, in said one of the started threads decrementing the active thread count on behalf of a dormant thread to indicate that the dormant thread has checked in at the consensus barrier, the program instructions are configured to implement:
        the stealing thread locating one of the other N threads that is in a dormant state as indicated by the thread state array and that has no more subtasks to be performed;
        the stealing thread atomically changing the corresponding state of the located dormant thread in the thread state array to indicate that the respective thread is stealing; and the stealing thread decrementing the active thread count to indicate that the located thread has checked in at the consensus barrier.

50. The non-transitory computer-accessible medium as recited in claim 37, wherein the subtasks apportioned to each thread are stored in a deque structure associated with the thread; and wherein each started thread is configured to pop a subtask off of the bottom of the deque structure associated with the respective thread to perform work indicated by the particular subtask.

51. The non-transitory computer-accessible medium as recited in claim 50, wherein the program instructions are further configured to implement:

one of the started threads generating one or more additional subtasks to be performed while work is being performed according to one of the subtasks popped from the associated deque structure; and the started thread pushing the one or more additional subtasks to be performed onto the bottom of the associated deque structure.

52. The non-transitory computer-accessible medium as recited in claim 37, wherein the task is garbage collection for a process, and wherein the threads are garbage collector worker threads.

53. The non-transitory computer-accessible medium as recited in claim 37, wherein the task is performed during a stop world operation in which another process is suspended for the duration of the task.

54. The non-transitory computer-accessible medium as recited in claim 37, wherein the stop world operation ends when each of the N threads have rendezvoused at the consensus barrier by decrementing the active thread count for each thread when the respective thread has no more subtasks available to perform, and wherein the other process is resumed when the stop world operation ends.

* * * * *